US012367619B2

(12) United States Patent
Andersson et al.

(10) Patent No.: US 12,367,619 B2
(45) Date of Patent: Jul. 22, 2025

(54) IMAGE PROCESSING USING COLOR VISION DEFICIENCY COMPENSATION

(71) Applicant: NVIDIA Corporation, Santa Clara, CA (US)

(72) Inventors: Johan Pontus Andersson, Lund (SE); Cyril Crassin, Meylan (FR); Tomas Akenine-Möller, Lund (SE)

(73) Assignee: NVIDIA Corporation, Santa Clara, CA (US)

( * ) Notice: Subject to any disclaimer, the term of this patent is extended or adjusted under 35 U.S.C. 154(b) by 292 days.

(21) Appl. No.: 17/944,091

(22) Filed: Sep. 13, 2022

(65) Prior Publication Data
US 2024/0087181 A1    Mar. 14, 2024

(51) Int. Cl.
| | |
|---|---|
| G06T 11/00 | (2006.01) |
| G06T 3/10 | (2024.01) |
| G06T 3/40 | (2006.01) |
| G06T 7/90 | (2017.01) |
| H04N 9/64 | (2023.01) |

(52) U.S. Cl.
CPC .............. *G06T 11/001* (2013.01); *G06T 3/10* (2024.01); *G06T 3/40* (2013.01); *G06T 7/90* (2017.01); *H04N 9/64* (2013.01); *G06T 2207/10016* (2013.01); *G06T 2207/10024* (2013.01)

(58) Field of Classification Search
None
See application file for complete search history.

(56) References Cited

U.S. PATENT DOCUMENTS 7,701,462 B2 *   4/2010   Hu .................. H04N 1/608
                                              345/589

OTHER PUBLICATIONS

Huang, W. et al. "Image recoloring for Red-Green dichromats with compensation range-based naturalness preservation and refined dichromacy gamut"; The Visual Computer, Jun. 22, 2022, 14 pages, https://dol.org/10.1007/s00371-022-02549-4.
Kotera, H. "A Spectral-based Color Vision Deficiency Model Compatible with Dichromacy and Anomalous Trichromacy"; 23rd Color and Imaging Conference Final Program and Proceedings, Oct. 2015, pp. 127-132; vol. 2015, No. 1.
Machado, G. M., "A Physiologically-based Model for Simulation of Color Vision Deficiency"; IEEE Transactions on visualization and computer graphics; posted online Oct. 11, 2009, pp. 1291-1298; 15(6).

* cited by examiner

*Primary Examiner* — Robert J Craddock
(74) *Attorney, Agent, or Firm* — Lowenstein Sandler LLP

(57) ABSTRACT

The technology disclosed herein involves using a transformation curve to modify colors of images so that those images are more easily viewed by persons with a color vision deficiency (CVD). The transformation curve is applied to spectral versions of images in which each pixel has a spectral representation to modify the spectral versions of the images. A spectral version of an image is modified by, for each pixel of the spectral version of the image, modifying intensities of one or more wavelengths by applying the one or more wavelengths to the transformation curve, which transforms the intensities from source wavelengths to destination wavelengths. The modified spectral version of the image is then modified to a modified version of the image in a color space, such as the RGB color space.

37 Claims, 22 Drawing Sheets
(5 of 22 Drawing Sheet(s) Filed in Color)

AS VIEWED BY PERSON WITH
NO COLOR VISION DEFICIENCY

AS VIEWED BY PERSON WITH
A COLOR VISION DEFICIENCY

D

E

F

IMAGE PROCESSING USING COLOR VISION DEFICIENCY COMPENSATION

TECHNICAL FIELD

Embodiments of the disclosure relate generally to image processing, and more specifically, relate to modifying images to compensate for color vision deficiencies.

BACKGROUND

Color vision deficiencies (CVDs), more generally known as color blindness, are often caused by genetics and affect the cones on the retina in people. About 4.5% of the world population (and 8% of the male population) has some kind of color vision deficiency. It can be difficult for color vision deficient people to distinguish between certain colors. This can result in a severe loss of information when presenting color deficient people with a rendered image. For example, shades of red and shades of green in an image are seen as shades of yellow for some color deficient people. To aid color deficient people, several image-recoloring (daltonization) methods have been proposed. Additionally, there are physical glasses for improving what color vision deficient people see, both through reflection of the wavelengths that make colors hard to differentiate (EnChroma) and by augmentations of the visual stimuli. However, current daltonization algorithms do not always change the image in a way that improves the experience for a color vision deficient person. There are even cases when the experience is worsened. Additionally, some of the existing techniques for daltonization take minutes to perform, and thus cannot be used for on-the-fly or real-time (or near real-time) recoloring of images. For example, existing techniques for daltonization may not be usable on frames of a video stream during streaming, or at the framerate of a video game.

There are different types of CVDs and different severities of each type of CVD. Some people have a slightly reduced capability of differentiating red and green while other people cannot differentiate between red and green at all. Others instead have issues telling the difference between blue and green. Differentiating between and adapting to the types and severities of color vision deficiencies is an important aspect to consider when designing algorithms for improving images for people with a CVD. Several existing daltonization techniques are not applicable across multiple different types of color vision deficiencies, and are instead tuned to correct only a single type of color vision deficiency.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
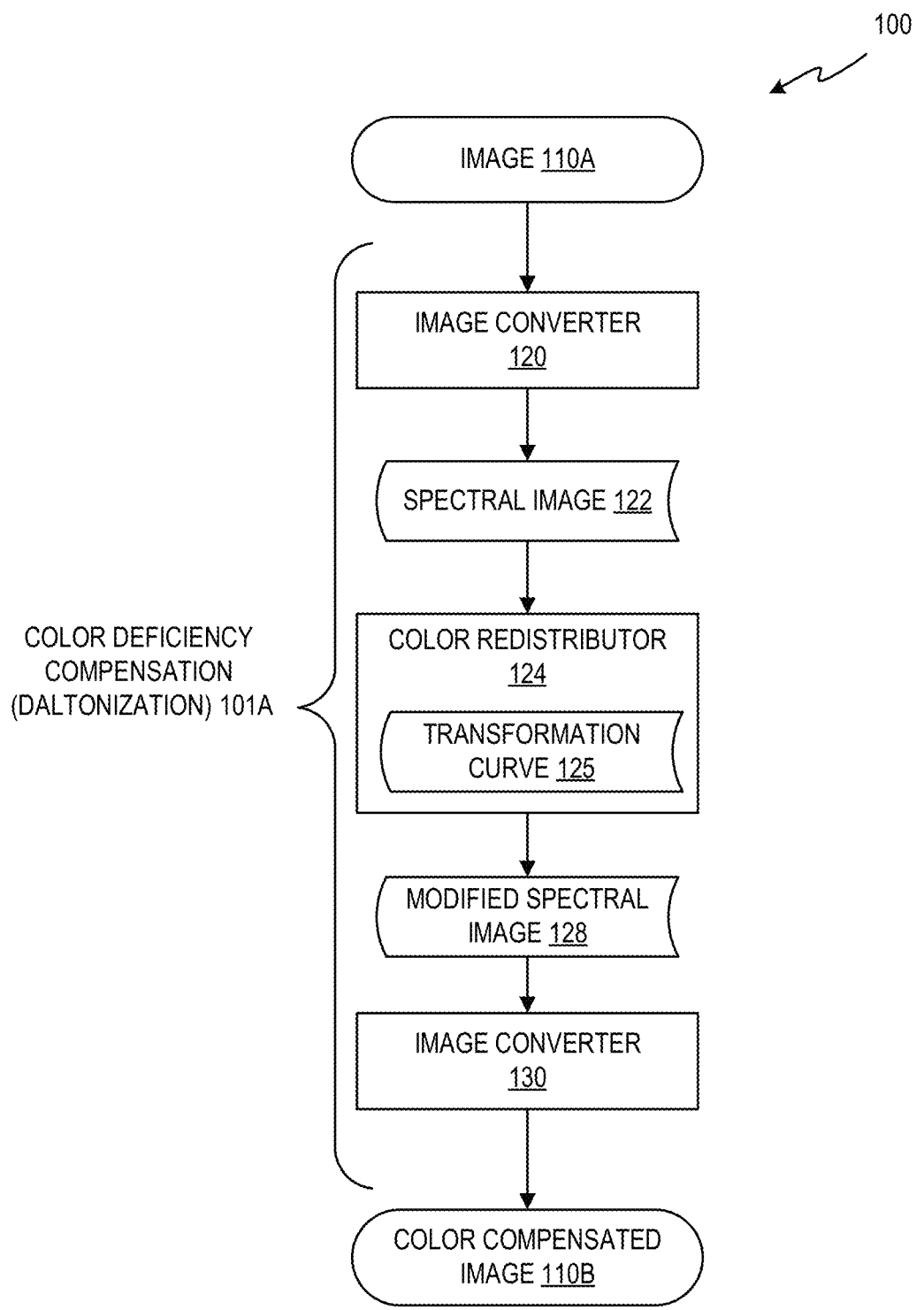
FIG. 1A illustrates an example computing environment that includes images and technology to perform color redistribution of images to accommodate persons with a color vision deficiency (CVD), in accordance with some embodiments of the present disclosure.

Images presented on displays such as computer monitors, displays of notebook computers, mobile computing device displays, televisions, and so on are optimized for viewing by persons without any color vision deficiencies (CVDs). When such images are viewed by persons with a CVD, certain aspects of those images may not be visible by the persons with the CVD, the person with the CVD may not be able to distinguish between certain colors in the image, and/or information may otherwise be lost for the person with the CVD. Prior attempts at performing image-recoloring (daltonization) for persons with a CVD have not been commercially viable. Such prior attempts were not adaptable to address the multiple different types and severities of CVDs that people can have, were too slow and/or processor intensive to be performed in real time (or near-real time), and/or introduced temporal instability (e.g., jitter).

Aspects of the present disclosure address the above and other deficiencies by providing technology for a daltonization system and method that uses few processor resources, can be performed quickly (e.g., on-the-fly, in real time, in near-real time, etc.), and can be applied to adjust images to compensate for many different types and severities of CVDs. In one or more embodiments, the daltonization system generates a transformation curve for a color vision deficiency (CVD) that shifts the intensity of wavelengths that persons having that CVD have trouble seeing and/or have a hard time separating to different wavelengths that the persons having the CVD do not have trouble seeing or separating. Images to be modified are converted to a spectral image, i.e., each pixel in the spectral image may contain a color spectrum. Then, for each pixel, at least one (e.g., each) wavelength of that pixel is input into the curve, and a destination wavelength is output. Thus, the intensity of each input wavelength is applied to an output wavelength. A spreading function is then applied to the output wavelength to divide the intensity of the output wavelength across multiple wavelengths. In embodiments, the transformation curve is generated by integrating (e.g., performing curve inversion of) a color deficiency profile (CDP) curve describing a vision deficiency of a person. The CDP curve can be determined via numerous different techniques. Different CDP curves can be generated for different CVDs, and once a CDP curve for a given CVD is determined, that CDP curve can be used to generate a transformation curve for transforming images. Alternatively, transformation curves can be generated without first generating CDP curves. Accordingly, the same technique can be performed to modify images to improve those images for many different CVDs simply by using a different CDP curve and/or transformation curve.

As set forth above, CVDs, more generally known as color blindness, are often caused by genetics and affect the cones on the retina. Because it may be hard for color vision deficient people to distinguish between certain colors, there might be a severe loss of information when presenting them with a rendered image. For example, the shades of red and green may appear as shades of yellow for some. There are different types of CVDs and different severities of each type of CVD. Some people have a slightly reduced capability of differentiating red and green while others cannot do it at all. Others instead have issues telling the difference between blue and green. Differentiating between the types and severities of color vision deficiencies can be an important aspect to consider when designing algorithms for improving images for people with a CVD. The color deficiency profiles (CDPs) and transformation curves described herein enable the daltonization system to take those aspects into account.

Existing techniques for modifying images to optimize those images for people with some degree of color blindness do not use CDP curves or transformation curves to modify the images, or do not work directly on a spectral representation. Existing techniques for modifying images to optimize those images for color blind persons also take much more computation than the techniques covered herein. As a result, existing techniques for modifying images generally take a long time (on the order of many seconds to minutes) to adjust the images, rendering such techniques unusable for adjusting images in real-time or on-the-fly. Additionally, many existing techniques are not temporally stable for video or real-time graphics, resulting in image sequences that flicker (i.e., due to color correction varying from frame to frame). Accordingly, existing techniques are not usable to modify, for example, frames of a video during streaming or playing of the video.

The technology disclosed herein may be used to adjust images in real time, in near real time, or on-the-fly. Additionally, the technology disclosed herein applies the same mapping of input colors to output colors even as scenes change, scene brightness changes, average colors in the scene change, and so on. As a result, the technology disclosed herein avoids the temporal instability (e.g., flickering) that is exhibited in existing daltonization techniques when applied to video. Accordingly, embodiments of the present technology enable a smooth and seamless viewing experience of videos (e.g., streaming videos), computer games, and images for persons with a CVD.

Various aspects of the above referenced technology are described in details herein below by way of examples, rather than by way of limitation.

FIG. 1A illustrates an example computing environment 100 for color redistribution of images to accommodate persons with a CVD, in accordance with some embodiments of the present disclosure. Computing environment 100 may include images 110A-B, 122, 128, image converter 120, color redistributor 124, and image converter 130.

Images 110A-B may include image content and represent the image content using image values. The image values may correspond to pixel values that originate from or are derived from an image sensor with pixel sensors. Each image may be a color image and may correspond to a still image (e.g., photograph), an image in a sequence of images (e.g., frames of a video), or a combination thereof. Images may also be synthetic images not generated by an image sensor (e.g., a frame of a game). Image 110A may be an input image for color deficiency compensation 101A and image 110B may be an output image generated after performance of color deficiency compensation (e.g., daltonization) 101A. Each of images 110A-B may correspond to a set of values and the set may have a size (e.g., set size) and each value may have a size (e.g., pixel size). The set size may be referred to as resolution and may be measured in a quantity of pixels such as, for example and without limitation, 720×480 (e.g., Standard-Definition (SD)), 1920×1800 (High Definition (HD)), 3840×2160 (Ultra High Definition (4K UHD)), 7680×4320(8K UHD), or other size or ratio. The value size may be referred to as the pixel size and may have a range (e.g., pixel value range) that is based on the number of bits. For example, the value size may be 8 bits (e.g., range 0-255), 10 bits (e.g., range 0-1023), 12 bits (e.g., range 0-4K), other number of bits, or a combination thereof. The value size (e.g., pixel size) may be related to the dynamic range of the respective image.

The dynamic range of each of images 110A-B is the range of luminance between a bright region of the image (e.g., brightest region) and a dark region of the image (e.g., darkest region). In one example, the dynamic range may be represented as a ratio between one or more of the brightest pixels (e.g., largest luminance value) and one or more of the darkest pixels (e.g., smallest luminance value). In another example, the dynamic range may be represented as a bit depth (e.g., 8 bit), color gamut (e.g., Rec 709 or sRGB), other numeric or non-numeric values, or a combination thereof. The dynamic range of image 110A, 110B may be, for example, a Standard Dynamic-Range (SDR), a Low Dynamic Range (LDR), a High Dynamic Range (HDR), a wide dynamic range, and so on. The term dynamic range may be the same or similar to luminance range, luminosity range, brightness range, intensity range, other range, or a combination thereof.

Image converter 120 may receive image 110A as input. Image converter 120 may determine a color space that the received image 110A is in. If the image 110A not a spectral image (e.g., a spectral version of an image in which each pixel has a spectral representation), then image converter 120 generates a spectral version of the image 110A (e.g., spectral image 122). Various techniques may be used to generate the spectral image 122. The specific techniques used to generate the spectral image 122 from image 110A may depend on a color space used for the image 110A.

If a spectral renderer is available, then each pixel may already have a spectrum, and in such cases those can be used as is. In many cases, rendering is done into a reduced representation, i.e., RGB or XYZ. These consist of three values to represent a pixel's color, while a spectral representation has many more. To that end, spectral upsampling methods have been developed. Those essentially take an RGB color (or color from another color space) and convert the color into a spectrum.

In an example, there are multiple known techniques for converting an image in a red, green, blue (RGB) color space to a spectral version of the image. In the field of spectral reflectance recovery, researchers have examined large sets of spectral reflectance distributions and their corresponding RGB vectors in order to learn how to map from RGB to spectra. Examples include radial basis function (RBF) network mapping and constrained sparse coding. Other examples use a large sparse dictionary of spectra and corresponding RGB projections that can then be used as a basis to map RGB vectors to spectra. Other examples use a two-step manifold-based mapping and reconstruction pipeline to reconstruct the spectra from a single RGB image. Another method is to convert from RGB to LMS, and then apply R-matrix theory in order to create a fundamental spectrum. Since a fundamental spectrum is different from a "standard" spectrum, a CDP curve and/or transformation curve that is generated to operate on images in a fundamental spectrum would need to be derived with fundamental spectrums in mind.

Ultimately, methods for spectral reconstruction may learn a discrete mapping from RGB images (or images in another color space) to a number of spectral bands. Such techniques may then be applied to an RGB image to convert, for each pixel, the R, G and B values of that pixel into values for each of a larger number of spectral bands (also referred to herein as bins). Each spectral band (or bin) may include a median or middle wavelength, a minimum wavelength, and a maximum wavelength. In one embodiment, 16 spectral bands are used. However, other numbers of spectral bands may be used, which may be greater or fewer than 16.

Image converter 120 outputs spectral image 122, which includes a spectrum representation for each pixel of the image 110A. Spectral image 122 may have a same resolution as image 110A. Each spectral representation may include a separate value (e.g., intensity value) for each spectral band used for the spectral image 122. For example, each pixel may have a first intensity value for a spectral band of 400-420 nm, a second intensity value for a spectral band of 420-440 nm, a third intensity value for a spectral band of 440-460 nm, a fourth intensity value for a spectral band of 460-480 nm, a fifth intensity value for a spectral band of 480-500 nm, a sixth intensity value for a spectral band of 500-520 nm, a seventh intensity value for a spectral band of 520-540 nm, an eighth intensity value for a spectral band of 540-560 nm, a ninth intensity value for a spectral band of 560-580 nm, a tenth intensity value for a spectral band of 580-600 nm, an eleventh intensity value for a spectral band of 600-620 nm, a twelfth intensity value for a spectral band of 620-640 nm, an thirteenth intensity value for a spectral band of 640-660 nm, a fourteenth intensity value for a spectral band of 660-680 nm, a fifteenth intensity value for a spectral band of 680-700 nm, and so on.

In another example, each pixel may have a first intensity value for a spectral band of 390-410 nm, a second intensity value for a spectral band of 410-430 nm, a third intensity value for a spectral band of 430-450 nm, a fourth intensity value for a spectral band of 450-470 nm, a fifth intensity value for a spectral band of 470-490 nm, a sixth intensity value for a spectral band of 490-510 nm, a seventh intensity value for a spectral band of 510-530 nm, an eighth intensity value for a spectral band of 530-550 nm, a ninth intensity value for a spectral band of 550-570 nm, a tenth intensity value for a spectral band of 570-590 nm, an eleventh intensity value for a spectral band of 590-610 nm, a twelfth intensity value for a spectral band of 610-630 nm, a thirteenth intensity value for a spectral band of 630-650 nm, a fourteenth intensity value for a spectral band of 650-670 nm, a fifteenth intensity value for a spectral band of 670-690 nm, a sixteenth intensity value for a spectral band of 690-710 nm, and so on.

Color redistributor 124 receives spectral image 122 (or image 110A if image 110A was already a spectral image), and processes the spectral image 122 to generate a modified spectral image 128, where colors of the modified spectral image are modified from those of spectral image 122 and image 110A in such a manner that they can be more readily discerned and/or differentiated between by a person with a CVD. Color redistributor 124 performs color compensation for spectral image 122 by applying a transformation curve 125 to the spectral image 122. The transformation curve is a specialized curve that transforms intensities of input wavelength into intensities of output wavelengths in such a manner that colors are redistributed around colors that a person with a particular type and/or severity of a CVD can see or discern. Different transformation curves 125 may be generated for each type of CVD and for each severity of CVD. Once a type and severity of a CVD for a particular person is determined, the transformation curve 125 associated with that type and/or severity of CVD can be accessed and used to correct or modify images for viewing by persons having that type and/or severity of CVD. In embodiments, for each pixel of a spectral image a source spectral representation of the pixel is obtained, an empty destination spectrum (e.g., in which all intensity values are initially zero) is generated, and for each value of the source spectrum processing logic transforms its representative wavelength using the transformation curve into a new wavelength, which is added to the destination spectrum.

Figure 11:
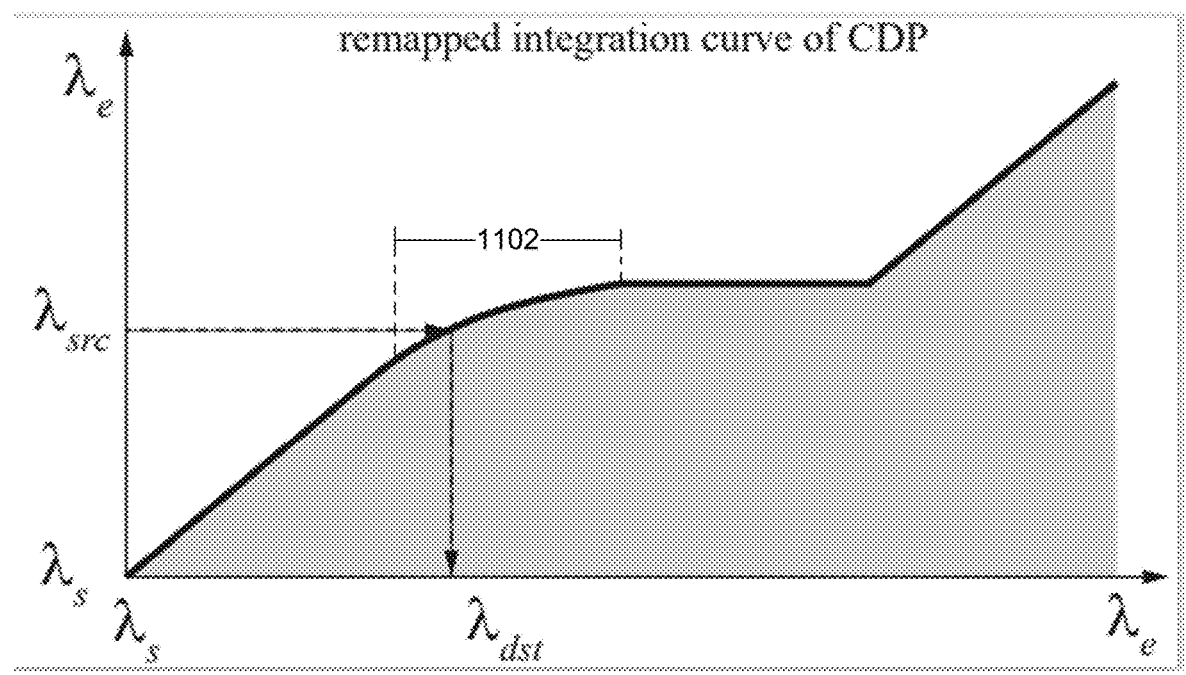
FIG. 11 illustrates an example transformation curve that is based on the CDP curve of FIG. 11, in accordance with some embodiments of the present disclosure.

FIG. 11 illustrates an example transformation curve 1100, in accordance with some embodiments of the present disclosure. In embodiments, the transformation curve includes an x-axis that represents a destination wavelength and a y-axis that represents a source wavelength. In embodiments, each of the x-axis and the y-axis of the transformation curve 1100 have a minimum value ($\lambda_s$) corresponding to a lowest spectral band used for the spectral image and a maximum value ($\lambda_e$) corresponding to a highest spectral band used for the spectral image. In embodiments, the y-axis of the transformation curve 1100 is mapped with a scale and bias so that it starts at $\lambda_s$ and ends at $\lambda_e$ on the y-axis as well as the x-axis.

For each pixel of spectral image 122, a wavelength of each spectral band used for the spectral image is applied to the transformation curve 1100. For each wavelength, the source wavelength ($\lambda_{src}$) may be found on the y-axis, and the x-value corresponding to source wavelength on the transformation curve 1100 may be identified, which represents the destination wavelength ($\lambda_{dst}$). The intensity of the source wavelength may then be applied to the destination wavelength. Accordingly, a destination wavelength may be determined for each source wavelength, and the intensity of the destination wavelength may equal the intensity of the source wavelength. In other words, to remap $\lambda_{src}$ into $\lambda_{dst}$ so that $\lambda_{dst}$ does not end up where the colorblind person cannot distinguish differences in colors, color redistributor 124 may start at $\lambda_{src}$ on the y-axis and then continue in the x-direction (horizontally) until the transformation curve 1100 is met. Then color redistributor 124 may move down (vertically) towards the x-axis, and the value on the x-axis is the transformed wavelength $\lambda_{dst}$. Note that for a properly designed transformation curve this method will not transform any value at all for wavelengths where a person does not have trouble viewing colors, and it will apply a smaller transform for values of wavelengths where there is a minor color vision deficiency and larger transform for values of wavelengths where there is a major color deficiency. In some embodiments, the transformation curve 1100 is a monotonically increasing curve, as shown. In some embodiments, the transformation curve 1100 may have been generated based on a color deficiency profile (CDP) curve, which is explained in greater detail below.

Since spectral representation of pixels is binned or otherwise comprises some basis function at a certain wavelength together with an intensity value, in embodiments this information is taken into consideration after remapping from $\lambda_{src}$ into $\lambda_{dst}$. Put another way, $\lambda_{src}$ will by definition be located exactly in the center of a bin (spectral range) or where the basis function is located, but that will not be the case for $\lambda_{dst}$. Accordingly, in embodiments color redistributor 124 spreads the information of $\lambda_{dst}$ to the nearest bins using a technique such as a spreading function. For each destination wavelength, processing logic applies a spreading function to distribute an intensity for the destination wavelength across at least two bins having a smallest distance from the destination wavelength. In one embodiment, a triangular function is used for the spreading function.

Figure 12:
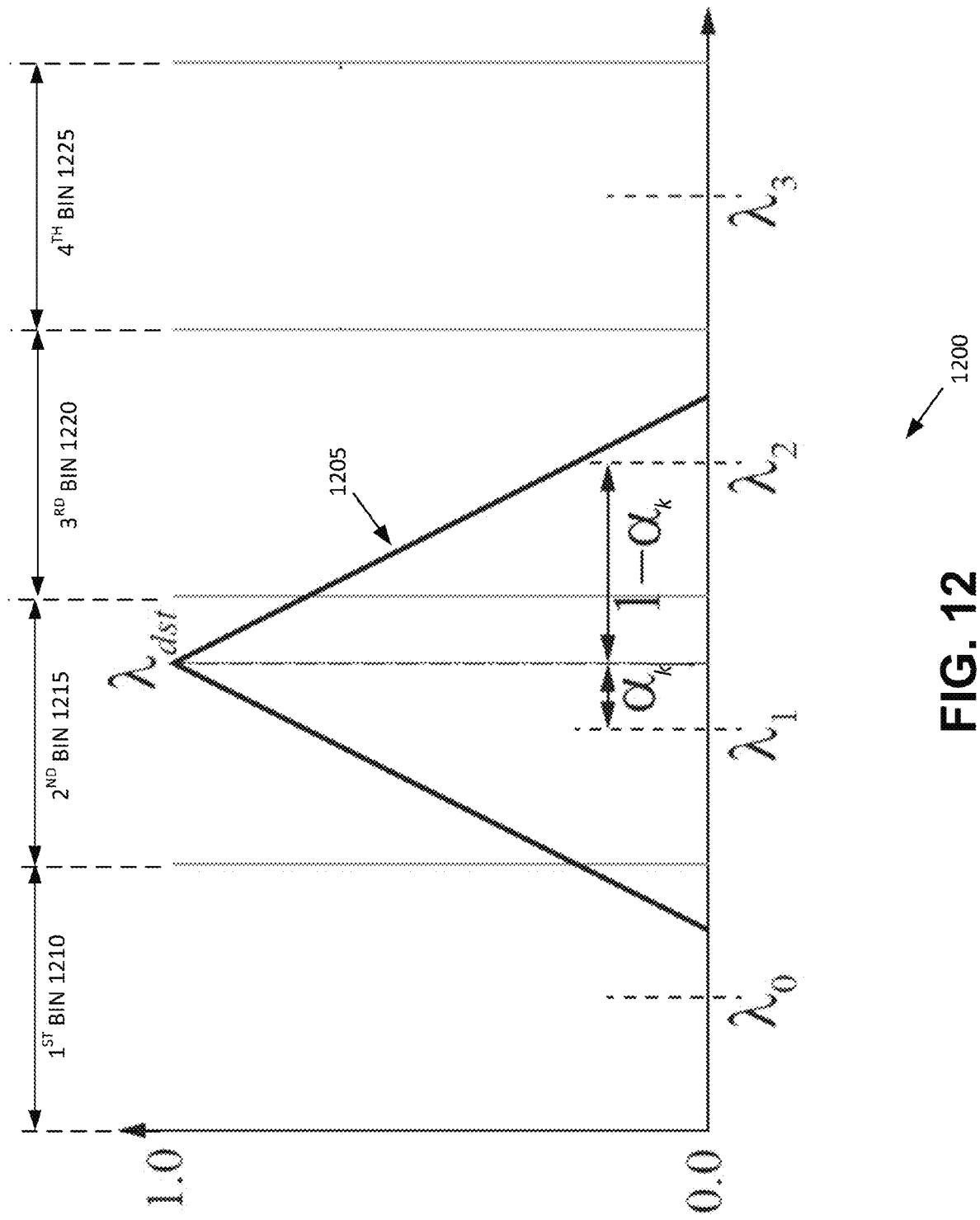
FIG. 12 illustrates a triangular filter configured to distribute intensities of destination wavelengths between multiple bins, in accordance with some embodiments of the present disclosure.

FIG. 12 illustrates a chart 1200 showing a triangular filter 1205 configured to distribute intensities of destination wavelengths between multiple bins (spectral ranges), in accordance with some embodiments of the present disclosure. The chart shows a first bin 1210, a second bin 1215, a third bin 1220 and a fourth bin 1225. An example destination wavelength ($\lambda_{dst}$) falls within second bin 1215, but is not at a center of the second bin 1215. Accordingly, in one embodiment distances are determined between the center wavelengths of one or more bins and the destination wavelength to find the two bins having a central wavelength with smallest distance to the destination wavelength. Once the two closest bins to the destination wavelength are determined, a fraction $\alpha_k \in [0, 1]$ is computed and the intensity is spread to the two closest bins (in this case $\lambda_1$ of second bin 1215 and $\lambda_2$ or third bin 1220) using $\alpha_k$ and $1-\alpha_k$ as weights. A certain $\lambda_{src}$ (which can be either of $\lambda_0, \lambda_1, \lambda_2, \lambda_3$, i.e., these are located in the center of the bins) is transformed to a certain $\lambda_{dst}$, which is generally not centered in a bin. In practice each of the source wavelengths and their corresponding intensities need to be transformed. Hence, processing logic can identify the source wavelength by an index k corresponding to wavelength center $\lambda_k$. The source intensity is denoted $I_k^{src}$ for bin k, which corresponds to $\lambda_k$. The destination intensities belong to a separate spectrum, and we denote them by $I_k^{dst}$ (note that the subscript k can be the same as for source, because it is just a general notation. Later we will use subscript p for the destination). These values may be zero before conversion starts. Next, processing logic computes an index m which is the lower index of the two bins closest $\lambda_{dst}$. Accordingly, the intensity of $\lambda_{dst}$ is then divided between $I_p^{dst}$ and $I_{p+1}^{dst}$ according to the following algorithms:

$$I_p^{dst} += I_k^{src} \cdot \alpha_k \qquad (1)$$

$$I_{p+1}^{dst} += I_k^{src}(1-\alpha_k) \qquad (2)$$

Note that in FIG. 12, p=1 and so $I_k^{src}$ is spread to bins with indices p=1 and p=2. Also note that in the equation above, "+=" means that the righthand side of the equations are added to what already is in the lefthand side.

The CDP curve and transformation curve 125 are constant per user and this can be exploited. This means that a source wavelength $\lambda_k$ is always mapped to a specific destination wavelength $\lambda_{k'}$. In some embodiments, transformation curve 125 is represented as a matrix. For each pixel of spectral image 122, applying the one or more wavelengths of the spectral representation for the pixel to the transformation curve 125 comprises performing a matrix operation using the matrix and the one or more wavelengths of the spectral representation for the pixel. In further embodiments, the transformation curve 125 and the spreading function (e.g., triangular function) may both be expressed via a matrix. For example, the triangular function may perform triangular mapping by computing a factor $\alpha_k$ in [0, 1] and performing:

$$d[p] += \alpha_k s[k] \qquad (3)$$

$$d[p+1] += (1-\alpha_k)s[k] \qquad (4)$$

Where s is the source spectrum and d is the destination spectrum. Note that d[p] indicates the $p^{th}$ component of the vector d, and so on. This is a similar expression to equations 1-2 above but using different notation.

In embodiments, a given wavelength index k will always map to the same output index p. This in turn means that $\alpha_k$ will always be the same. The result of that is that one can express the entire curve inversion and the triangular mapping as a matrix multiplication, i.e., $$d = Ms$$

where s is the source spectrum of size n×1 and d is the remapped and triangular mapped destination spectrum, also of size n×1.

The matrix $M=(m_{pk})$ may be of size n×n and may contain 2×(n−1) nonzero elements, which can be written:

$$m_{pk} = \begin{cases} \alpha_k, & \text{if } V_c(\lambda_k) \in [\lambda_p, \lambda_{p+1}], \\ 1 - \alpha_k, & \text{if } V_c(\lambda_k) \in [\lambda_{p-1}, \lambda_p], \\ 1, & \text{if } (p, k) == (0, 0) \| (p, k) == (n-1, n-1), \\ 0, & \text{otherwise} \end{cases} \quad (5)$$

where $V_c(\lambda)$ denotes the transfer function of wavelengths under the CDP curve or transformation curve c, e.g., $V_c(\lambda_{src}) = \lambda_{dst}$.

Multiplying the input spectrum by M is substantially faster than searching in an array, computing fractions of different sorts, and weighting together with on-the-fly generated indices into arrays. In embodiments, the surrounding parts of computing environment 100 may contain several matrix multiplies as well, and so long as a sequence of steps contains just matrix multiplies, processing logic can instead pre-multiply all these together into a single matrix. This will result in a 3×n matrix, and this makes the architecture substantially faster, compared to using a loop and if-cases.

Returning to FIG. 1A, color redistributor 124 outputs a modified spectral image after transformation curve 125 has been applied to each wavelength of each pixel in spectral image 122. Modified spectral image 128 includes a modified spectral representation of one or more pixels of spectral image 122.

Image converter 130 processes modified spectral image 128 to generate a color compensated image 110B that is in a color space. The color space may be one that is used by a processing device to display images. In one embodiment, color compensated image 110B is in a same color space as image 110A. In one embodiment, color compensated image 110B is in a different color space than image 110A. In one embodiment, color compensated image 110B is in an RGB color space. In other embodiments, color compensated image 110B may be in a CIEUVW color space, a CIELUV color space, a CIELAB color space, an HSLuv color space, a uniform color space (UCS), a YUV color space, an HSV color space, a CMYK color space, a CMY color space, or other color space. The color compensated image 110B may then be rendered and/or output to a display.

Figure 1B:
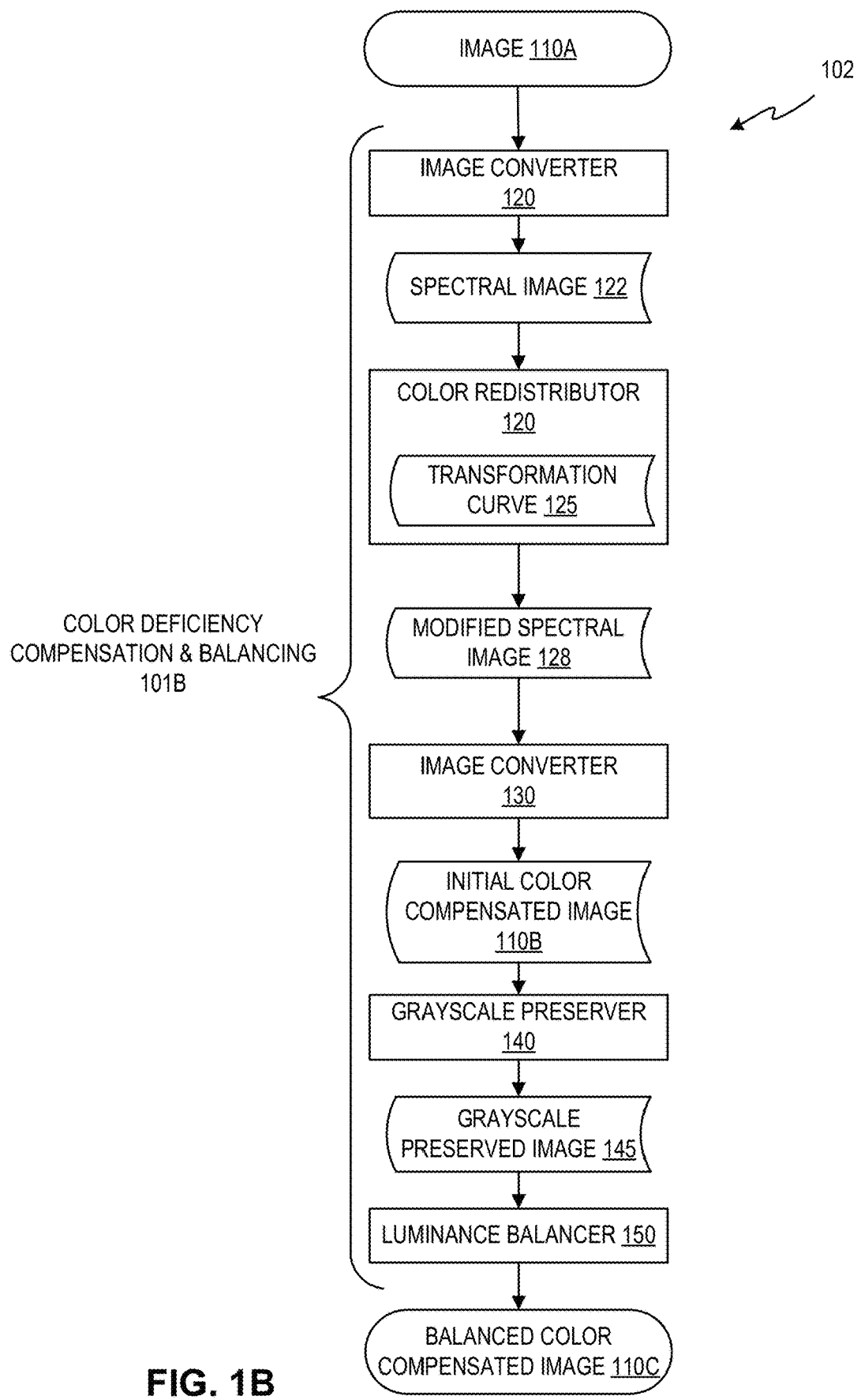
FIG. 1B illustrates an example computing environment that includes images and technology to perform color redistribution of images to accommodate persons with a color vision deficiency (CVD), in accordance with some embodiments of the present disclosure.

FIG. 1B illustrates an example computing environment 102 that includes images and technology to perform color redistribution of images to accommodate persons with a color vision deficiency (CVD), in accordance with some embodiments of the present disclosure. Computing environment 102 may include images 110A, 110B, 110C, 122, 128, 145, image converter 120, color redistributor 124, image converter 130, grayscale preserver 140 and luminance balancer in embodiments. These components may operate together to perform color deficiency compensation and balancing 101n.

In embodiments, image converter 120 operates on image 110A to generate spectral image 122 as described with reference to FIG. 1A. In embodiments, color redistributor 124 includes transformation curve 125 and uses transformation curve 125 to operate on spectral image 122 and generate modified spectral image 128 as described with reference to FIG. 1A. In embodiments, image converter 130 operates on modified spectral image 128 to generate initial compensated image 110B as discussed with reference to FIG. 1A.

A person with a CVD will perceive achromatic colors the same as someone without a CVD. Accordingly, it can be beneficial to maintain gray colors, and also colors that are close to gray, during recoloring. If this can be done, then white colors would also be white after daltonization. If steps are not taken to preserve gray colors, a white can turn into a slightly pink color, for example, which gives an incorrect experience of the image.

Grayscale preserver 140 may receive initial color compensated image 110B and/or image 110A. In embodiments, grayscale preserver 140 performs one or more operations to preserve a grayscale of the image 110A. To preserve the grayscale of the image 110A such that a final color compensated image 110C has a same or similar grayscale as image 110A, grayscale preserver 140 may perform one or more grayscale preservation operations for each pixel. In one embodiment, for each pixel of initial color compensated image 110B and/or for image 110A, grayscale preserver 140 determines a gray value representing an amount of gray in the pixel from the image 110A. Grayscale preserver 140 then mixes an original color of the pixel from the image 110A with an adjusted color of the pixel from the modified version of the image (initial color compensated image 110B) based on the gray value. The mixed color value may then replace the color value in initial color compensated image 110B to yield a color compensated image for which grayscale has been preserved (grayscale preserved image 145).

In one embodiment, grayscale preserver 140 converts initial color compensated image 110B and/or image 110A into the Lab color space. Grayscale preserver 140 may then compute β, which is a number in [0, 1], according to the following equation:

$$\beta = 1 - \frac{\sqrt{a^2 + b^2}}{M} \quad (6)$$

where M≈133.81 is the largest Euclidean norm of all (a, b) vectors stemming from converting an sRGB gamut of the initial color compensated image 110B and/or image 110A to the Lab space. Grayscale preserver 140 may then compute a weight to apply to the colors of the image 110A and to the colors of the initial color compensated image 110B for a mixing function.

In one embodiment, for each pixel a final weight (w) may be computed according to the equation:

$$w = \beta^k \quad (7)$$

Where k is a positive value. In one embodiment, k is a positive integer. In one embodiment, k is equal to 4. In other embodiments, another function may be used rather than a power function to compute the final weight w. In embodiments, the final weight may be a gray value representing an amount of gray in a pixel.

A grayscale-maintained color of a pixel may then be computed as a combination (e.g., a linear combination) of the original color ($c_o$) (e.g., the color for the pixel from image 110A) and the daltonized color (ca) (e.g., the color for the pixel from initial color compensated image 110B). In one embodiment, the colors for the pixel are computed according to the following equation:

$$c_f = wc_o + (1-w)c_d \quad (8)$$

where $c_f$ is the final combined color for the pixel.

Accordingly, for each pixel, grayscale preserver 140 may determine a gray value (e.g., w) representing an amount of gray in the pixel, and may then mix an original color of the pixel from the image 110A (i.e., the original version of the image as it was prior to being modified) with an adjusted color of the pixel from the modified version of the image 110B based on the gray value. In an example, a gray pixel would have (a, b)=(0, 0), yielding w=1 and an output color that is the same as the input, so grayscale is preserved.

Grayscale preserver 140 may output a grayscale preserved image 145 in which image colors have been updated based on grayscale values to preserve grays in the image.

Luminance balancer 150 may receive a grayscale preserved image 145, image 110A, and/or initial color compensated image 110B, and may perform luminance balancing for the image(s). Since the daltonization techniques described herein move energy from some wavelengths into other wavelengths of the spectrum, this can result in RGB colors outside the range [0, 1]. This means that the luminance of a pixel may change, and may not even be presentable on standard displays. To avoid this, luminance balancer 150 may be used to ensure that the luminance of the source RGB pixel of image 110A is maintained even after daltonization.

In some embodiments, luminance balancer preserves or balances luminance by computing one or more luminance balancing operations for each pixel. For a given pixel performing luminance balancing operations may include computing a first luminance value of the pixel for the image 110A as viewed by a person without a color vision deficiency (CVD) and a second luminance value of the pixel for the modified version of the image (initial color compensated image 110B) as viewed by the person with the CVD. For the given pixel, performing luminance balancing operations further includes determining a scaling factor based on a ratio between the first luminance value and the second luminance value. For the given pixel, performing luminance balancing operations further includes applying the scaling factor to adjust an intensity of the pixel. For example, for a pixel of an RGB image the scaling factor may be applied to each of the R, G, and B color channels.

In one embodiment, given a source pixel color s and a destination pixel color ca, luminance balancer 150 computes a luminance-adjusted color as:

$$c_{fl} = c_d \frac{y(s)}{y(v(c_d))} \quad (9)$$

Where $c_n$ is the final luminance adjusted color, where y(c) computes the luminance of the color c (in one example by transforming the color to Lab color space and taking the L component) and v is a function that simulates what color a colorblind person would see. In one embodiment, this function is performed via matrix multiplication with one or more appropriate matrices.

A final balanced color compensated image 110C may be output after grayscale preservation and luminance preservation/balancing has been performed on initial color compensated image 110B.

Figure 2:
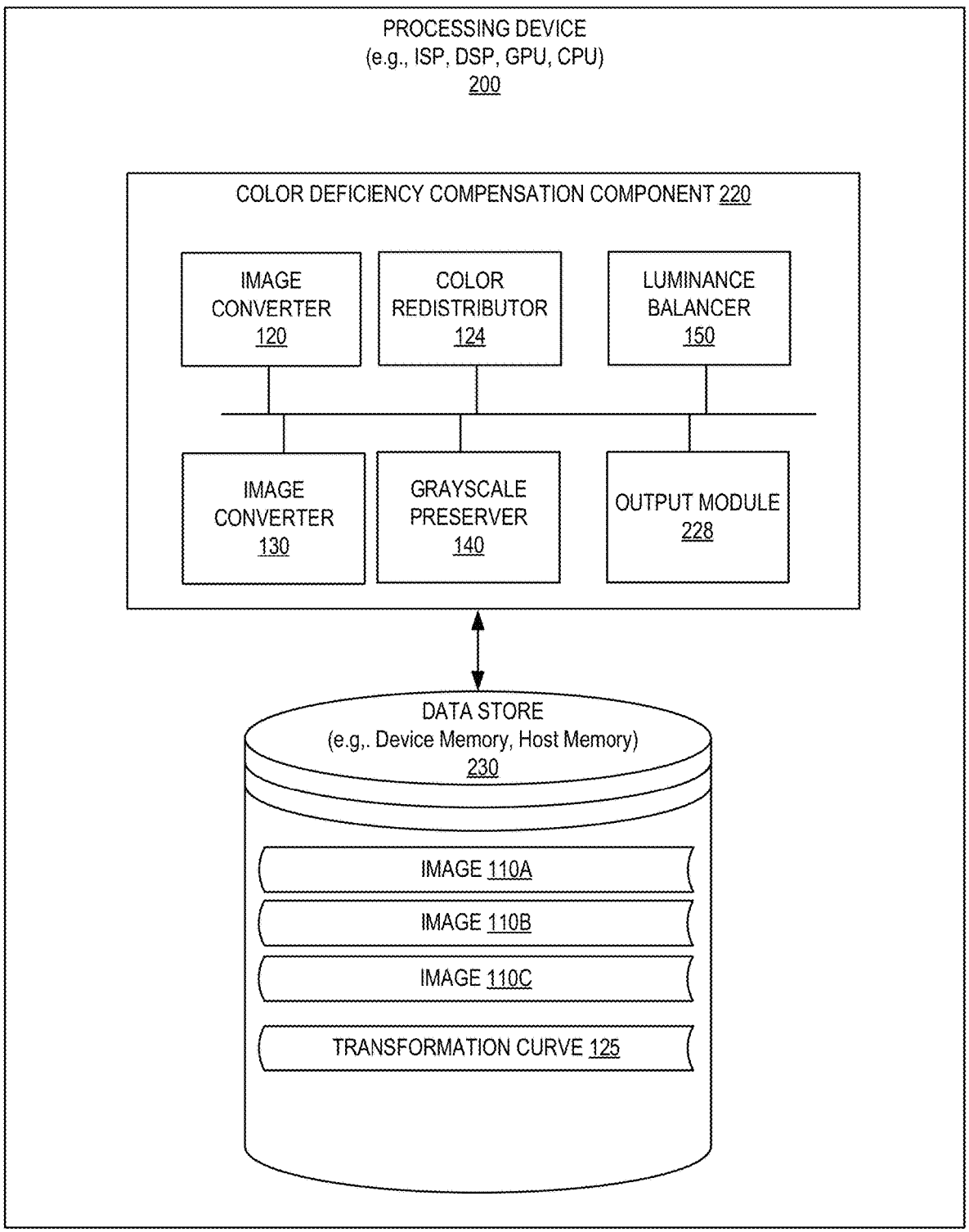
FIG. 2 is a detailed block diagram of a processing device that includes technology to perform color redistribution of one or more images, in accordance with some embodiments of the present disclosure.

FIG. 2 depicts a block diagram illustrating an exemplary processing device 200 that implements technology for performing color compensation (e.g., daltonization), in accordance with one or more aspects of the present disclosure. Processing device 200 may be configured to receive image 110A and perform color deficiency compensation 101A-B to produce image 110B and/or image 110C, as discussed above in regards to FIG. 1A-B. In the example illustrated in FIG. 2, processing device 200 may include a color deficiency compensation component 220 that includes image converter 120, color redistributor 124, image converter 130, grayscale preserver 140, luminance balancer 150 and/or an output module 228. One or more of the blocks may be logic blocks and may be implemented as hardware (e.g., integrated circuits (IC) or other circuitry), computer code (e.g., firmware, software, or other program), or a combination thereof. More or less components or modules may be included without loss of generality. For example, two or more of the components may be combined into a single component, or features of a component may be divided into two or more components.

Processing device 200 may be one or more devices that are capable of processing data of one or more images. Processing device 200 may be referred to as an image processor and may be or include one or more Image Signal Processors (ISPs), Digital Signal Processors (DSPs), Graphical Processing Units (GPUs), Central Processing Units (CPUs), Data Processing Units (DPUs), Field Programmable Gate Arrays (FPGAs), Application Specific Integrated Circuits (ASICs), other integrated circuit, or a combination thereof.

Processing device 200 may receive one or more images from another device as analog signals, digital signals, or a combination thereof. Alternatively, processing device 200 may generate images and/or may receive images from itself. For example, processing device 200 may generate images, store those images to memory, retrieve the images from memory, and then perform daltonization of those images. The other device may be a source of one or more images and may be a gaming engine (e.g., game console or program), media player (e.g., set top box, DVD player, streaming application), host processor (e.g., CPU), image sensor (e.g., camera), storage device (e.g., main memory), other source, or a combination thereof. The images may be a sequence of images and each image in the sequence may be a video frame. Processing device 200 may receive the images as encoded images, raw images, or a combination thereof. The received images may have colors that are not optimal for viewing by a person with a CVD.

Processing device 200 may include a data store 230 (e.g., a device memory, host memory, etc.) in which data can be temporarily stored before, during and/or after processing. The data store 230 may be used, for example, to store image 110A, image 110B, image 110C and/or transformation curve 125.

Output module 228 may enable processing device 200 to output the color compensated image 110B or balanced color compensated image 110C to one or more devices. The devices may include a display device, a data storage device, a data transmission device, another processing device, other device, a program or function executing on processing device 200, or a combination thereof. Outputting image data to a display device (e.g., television, monitor, projector) may be the same or similar to displaying or playing the image data. Outputting image data to a data storage device (e.g., memory, hard drive, solid-state drive) may be the same or similar to storing the image data. Outputting image data to a data transmitting device (e.g., network, bus, interconnect) may be the same or similar to streaming the image data.

The daltonization techniques described hereinabove rely on use of a transformation curve that converts intensities of input wavelengths into intensities of output wavelengths. According to embodiments there are multiple techniques for producing such transformation curves.

Figure 3:
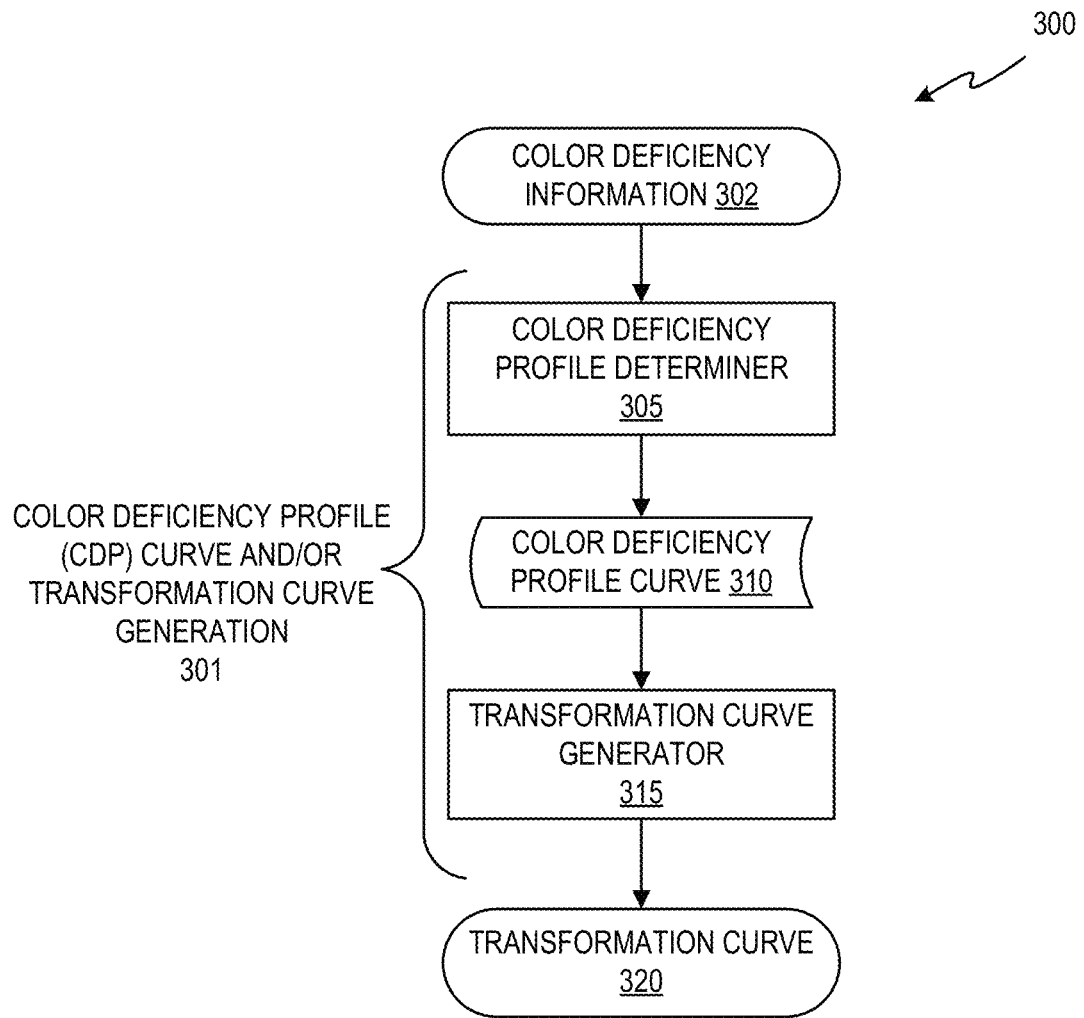
FIG. 3 illustrates an example computing environment that includes technology to generate a transformation curve for performing color redistribution of images, in accordance with some embodiments of the present disclosure.

FIG. 3 illustrates an example computing environment 300 that includes technology to generate a transformation curve 320 that may be used for performing color redistribution (e.g., daltonization) of images, in accordance with some embodiments of the present disclosure. Computing environment 300 may include color deficiency information 302, color deficiency profile determiner 305, transformation curve generator 315 and transformation curve 320. The computing environment 300 may be used to perform color deficiency profile (CDP) curve generation and/or transformation curve generation 301 in embodiments.

In some embodiments, generation of a transformation curve starts with receipt of color deficiency information 302. The color deficiency information may be received as a general descriptor of a type and/or severity of a CVD of a person for which images will be color compensated. For example, color deficiency information 302 may include an indication that the person has a CVD for (e.g., shades of) reds and greens. In some embodiments, the color deficiency information 302 can be used to perform a lookup on a data store to identify an initial CDP profile associated with the CVD in question. In some embodiments, the color deficiency information 302 is or includes a CDP curve, which may be an initial CDP curve used as a starting point for determining a final CDP curve, or which may be a final CDP curve that will be used for color compensation.

FIG. 10 and FIGS. 14A-C illustrate example CDP curves. For each of the CDP curves, the x-axis shows wavelength (k) and the y-axis is a number from 0 to 1, where the number indicates an ability of a person with a CVD to see a particular wavelength of light. A value of 1 indicates that the person with the CVD has no difficulty seeing a wavelength of light, while a value of 0 indicates that the person cannot see that wavelength of light at all. The lower the value for a particular wavelength, the poorer a person's ability to discern that wavelength who has the CVD. A person without a color vision deficiency would have a CDP curve being 1.0 for all wavelengths. For a person with color vision deficiency, the CDP would have values lower than 1.0 for the wavelengths where the person has a color deficiency.

Figure 14A:
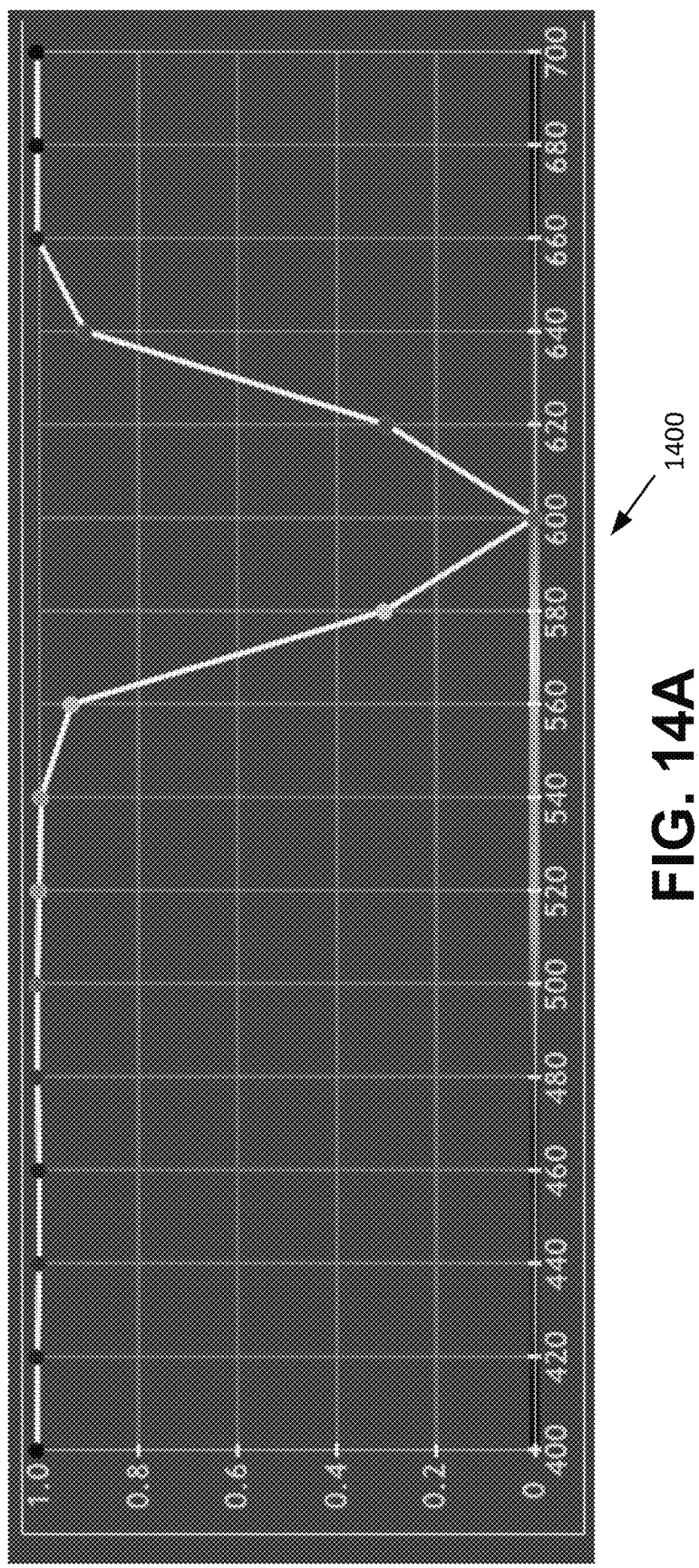
FIG. 14A illustrates a first example CDP curve, in accordance with some embodiments of the present disclosure.

FIG. 14A illustrates a first example CDP curve 1400 in which a person has color blindness about the green to red range of wavelengths. In FIG. 14A, the CDP curve indicates that the person has trouble seeing color differences around λ=600, i.e., in the red colors.

Figure 14B:
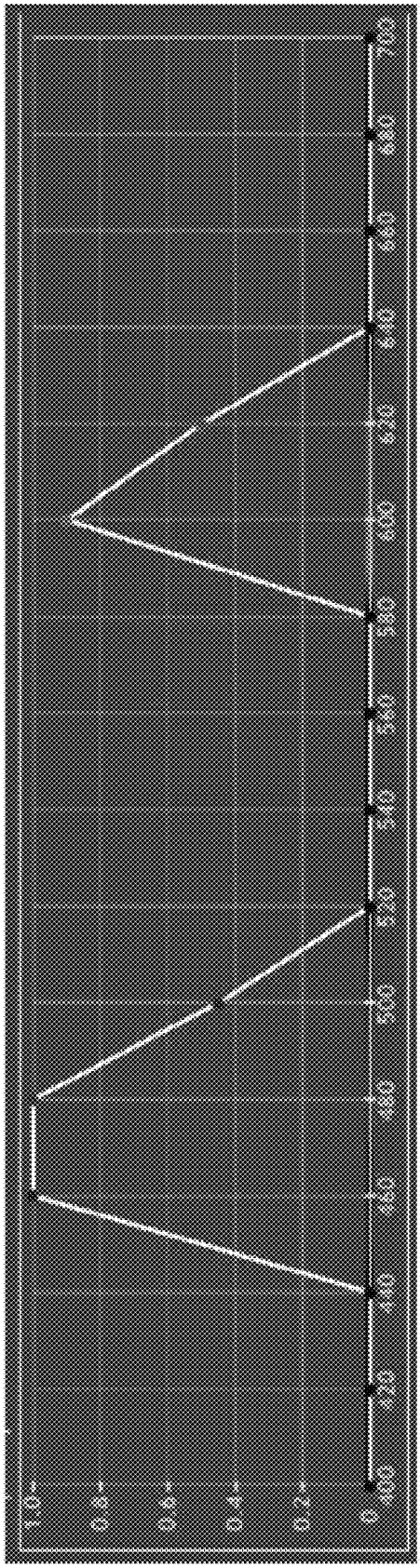
FIG. 14B illustrates a second example CDP curve, in accordance with some embodiments of the present disclosure.
Figure 14C:
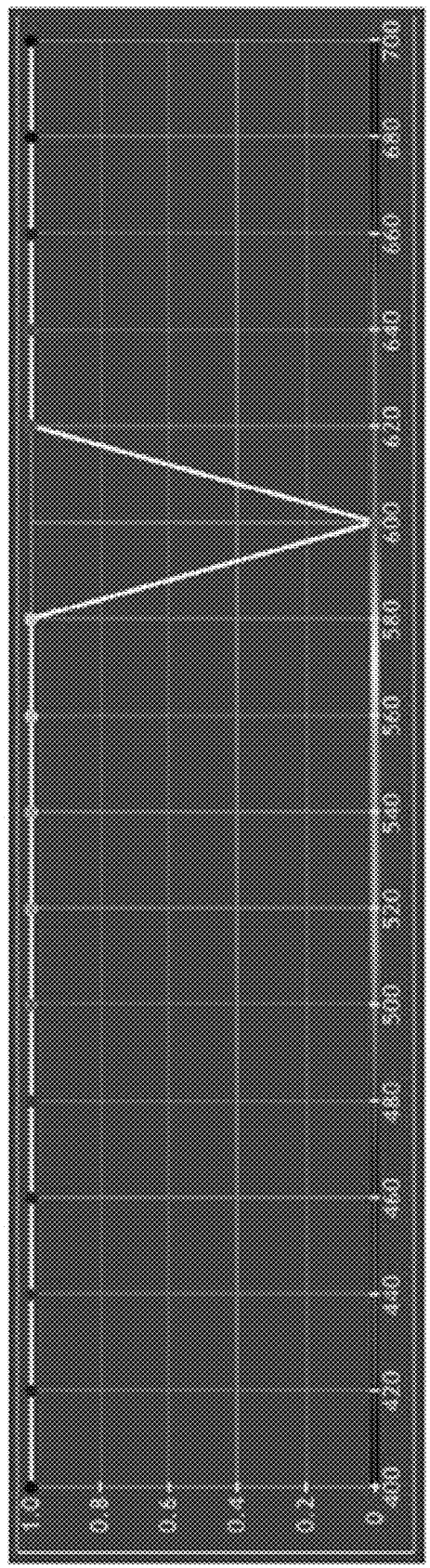
FIG. 14C illustrates a third example CDP curve, in accordance with some embodiments of the present disclosure.

FIG. 14B illustrates a second example CDP curve 1430 in which a hypothetical person cannot see light in the wavelengths of 400-440 nm, 520-580 nm and 640-700 nm, and in which the person has some difficulty seeing light in the wavelengths of 480-520 nm and 580-640 nm. FIG. 14C illustrates a third example CDP curve 1470 in which a person has color blindness about the green to red range of wavelengths, where the color blindness is more severe than the color blindness represented in the first example CDP curve 1400 for the same type of color blindness.

Returning to FIG. 3, color deficiency profile determiner 305 may determine a CDP curve to be used for a particular person, for a particular type of color blindness, and/or for a particular type and severity of color blindness. In one embodiment, CDP determiner 305 receives color deficiency information 302 that includes a CDP curve to use. In other embodiments, CDP determiner 305 performs one or more operations to determine a CDP curve to use based on received color deficiency information 302. In an example, CDP determiner 305 could adjust the curve for each wavelength until an image, adjusted according to the method and the CPD in question, starts to show more preferable properties than before. In another example, CDP determiner 305 may try several different CDP curves for a standard set of color deficiencies and then let a person select the one that best improves their experience.

In another example, CDP determiner computes the CDP curve from the long, medium, short (LMS) cone fundamentals. The cone fundamentals describe the responses of the cones on the retina and are thus different for a person with a CVD compared to someone without one. Most often, a person with a CVD has deficiencies in one of the three cone types, but not several. The CDP determiner 305 can compute a CDP through comparing the cone fundamentals between the person with a CVD and someone without one. One way to do that would be to compute the integrals of the fundamentals over the given wavelength range, normalizing them (so that they are both in the [0, 1] range), and then taking the difference between the two. The CPD curve is then created by taking one minus that difference. Formally, we have that the suggested CPD, c, at a given wavelength, λ, would be:

$$c(\lambda) = 1 - g(|S_N(\lambda) - S_{CVD}(\lambda)|) \quad (10)$$

$$S_N(\lambda) = \frac{\int_{t=\lambda_s}^{\lambda} F_N(t)}{\int_{t=\lambda_s}^{\lambda_e} F_N(t)} \quad (11)$$

$$S_{CVD}(\lambda) = \frac{\int_{t=\lambda_s}^{\lambda} F_{CVD}(t)}{\int_{t=\lambda_s}^{\lambda_e} F_{CVD}(t)} \quad (12)$$

where $F_N$ is the LMS fundamental of the person without a CVD and $F_{CVD}$ is the LMS fundamental of the person, and $\lambda_s$ and $\lambda_e$ respectively denote the shortest and longest wavelength in the considered wavelength interval.

Note that F is either the L, M, or S fundamental depending on the type of CVD we consider. The $F_{CVD}$ is found through some kind of color vision deficiency model, which may be included in color deficiency information 302. The function g: [0, 1]→[0, 1] makes it possible to change the behavior of the CPD by, e.g., making it go down to 0 for some wavelengths and CVD severities, or making the drop sharper/wider.

Two techniques for determining a CDP curve are discussed below with reference to FIGS. 7-9. Multiple other techniques may also be used to generate a CDP curve.

Once color deficiency profile determiner 305 determines a CDP curve 310 to use, it outputs that CDP curve for processing by transformation curve generator 315.

Transformation curve generator 315 generates a transformation curve 320 that can be used to convert input wavelength intensities into output wavelength intensities. In some embodiments, transformation curve generator 315 generates a transformation curve 320 based on a received CDP curve 310. In some embodiments, transformation curve generator 315 generates a transformation curve 320 based directly on received color deficiency information 302, and generation of a CDP curve may be skipped.

Figure 10:
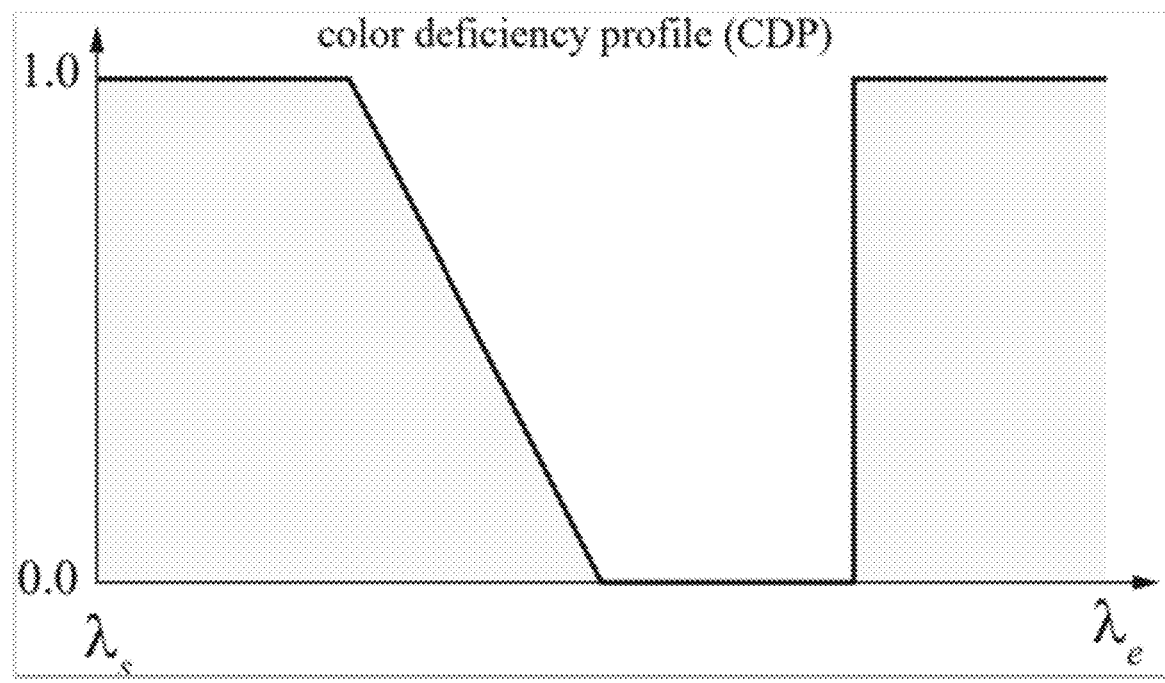
FIG. 10 illustrates an example CDP curve, in accordance with some embodiments of the present disclosure.

In one embodiment, a transformation curve 320 is generated by integrating CDP curve 310 (e.g., by performing curve inversion). FIG. 10 shows an example CDP curve, and FIG. 11 shows an example transformation curve generated by integrating the CDP curve of FIG. 10. Assume that we have the CDP curve of FIG. 10, which starts at $\lambda_s$ and ends at $\lambda_e$ on the x-axis. This curve may be integrated to form the transformation curve of FIG. 11, where transformation curve generator 315 has remapped the y-axis with a scale and bias so that it starts at $\lambda_s$ and ends at $\lambda_e$ on the y-axis as well. As shown, the transformation curve of FIG. 11 includes a non-straight line segment (e.g., quadratic curve) 1102 that was generated by integrating a linear segment of the CDP curve. In an alternative embodiment, a different technique may be used to generate the transformation curve from the CDP curve that results in a linear version of the non-straight line segment 1102. In either instance, $\lambda_{dst}$ may be computed by following $\lambda_{src}$ horizontally until it intersects with a line segment (e.g., quadratic curve segment or linear segment), and then determine the $\lambda_{dst}$ value that intersects with the $\lambda_{src}$ value on the curve.

As discussed with reference to FIGS. 1A-B, the transformation curve may then be used to remap $\lambda_{src}$ into $\lambda_{dst}$ so that $\lambda_{dst}$ does not end up where the colorblind person cannot distinguish differences in colors. To do this, processing logic may start at $\lambda_{src}$ on the y-axis and then continues in the x-direction (horizontally) until the curve is met. Processing logic may move down (vertically) towards the x-axis, and the value on the x-axis is the transformed wavelength $\lambda_{dst}$. For example, processing logic may modify intensities of one or more wavelengths by applying the one or more wavelengths to a transformation curve that transforms the intensities from source wavelengths to destination wavelengths. This may include determining an intensity of a source wavelength for a pixel, wherein the intensity of the source wavelength is associated with a y-axis value for the transformation curve, and determining an x-axis value of the transformation curve that corresponds to the y-axis value, wherein the x-axis value corresponds to a destination wavelength.

Note that this method will not transform any value at all to regions where the CDP curve is zero, and it will transform fewer values into regions where the CDP curve is lower and more values into regions where the CDP curve is higher. For example, in FIGS. 10-11, no $\lambda_{src}$ will be transformed into a $\lambda_{dst}$ such that it is located on the x-axis where the CDP curve is zero. This is so, since the transformation curve corresponding to the CDP curve is horizontal in that region.

Figure 13:
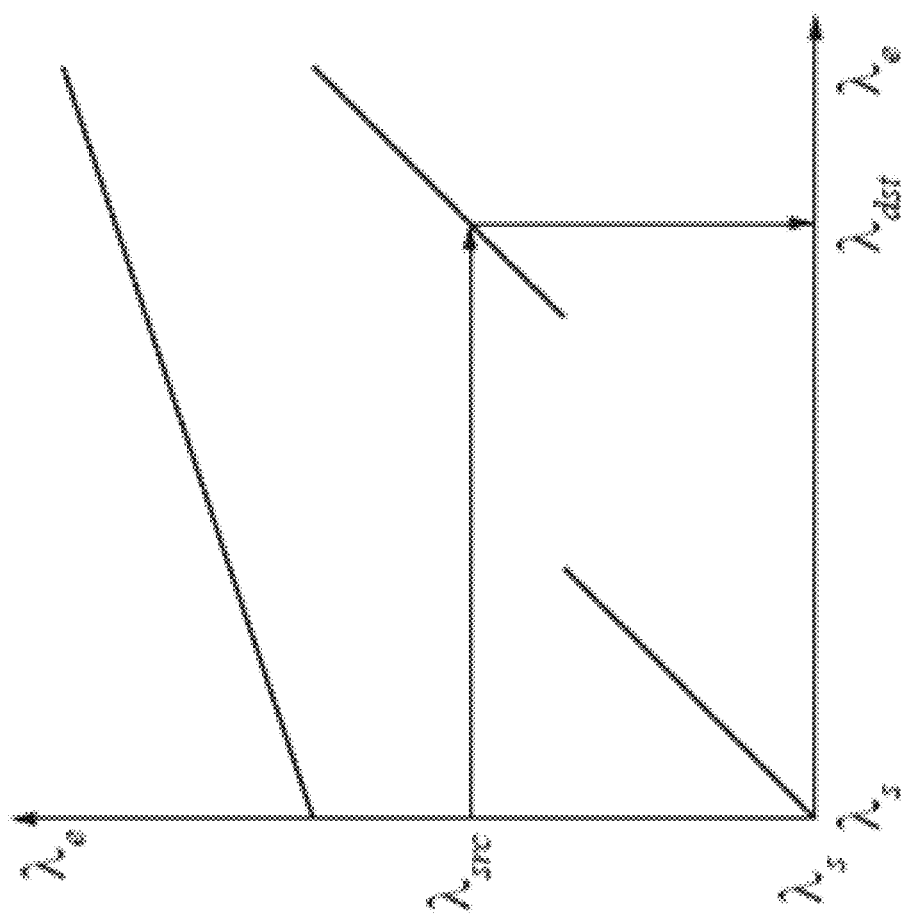
FIG. 13 illustrates an example transformation curve that is not based on any CDP curve, in accordance with some embodiments of the present disclosure.

As set forth above, CDP curves can be computed via an optimization procedure that attempts to reduce colorblindness metrics for a set of images. To provide even more flexibility, instead of providing a CDP curve and then integrating that curve, processing logic may optimize for a more general version of the "integrated" transform curve, as is shown in FIGS. 13A-B. This generalization is more flexible, since processing logic can provide a map that, for example, indicates that all reddish colors should map to the entire spectrum. This is what is shown to the in FIG. 13B for high $\lambda$ on the x-axis.

Transformation curves may be generated without reliance on CDP curves. FIG. 13A illustrates an example transformation curve that is not based on any CDP curve, in accordance with some embodiments of the present disclosure. Such a more generalized transformation curve as shown in FIG. 13A that is not generated based on integrating a CDP curve is not necessarily monotonically increasing. Additionally, the transformation curve that is generated from scratch (e.g., not from a CDP curve) may be a generalized curve in which a portion of the y-axis can map to anywhere on the x-axis, which can never happen with integration. In some embodiments, a transformation curve may be inverted or rotated, as shown in FIG. 13B.

Figure 4:
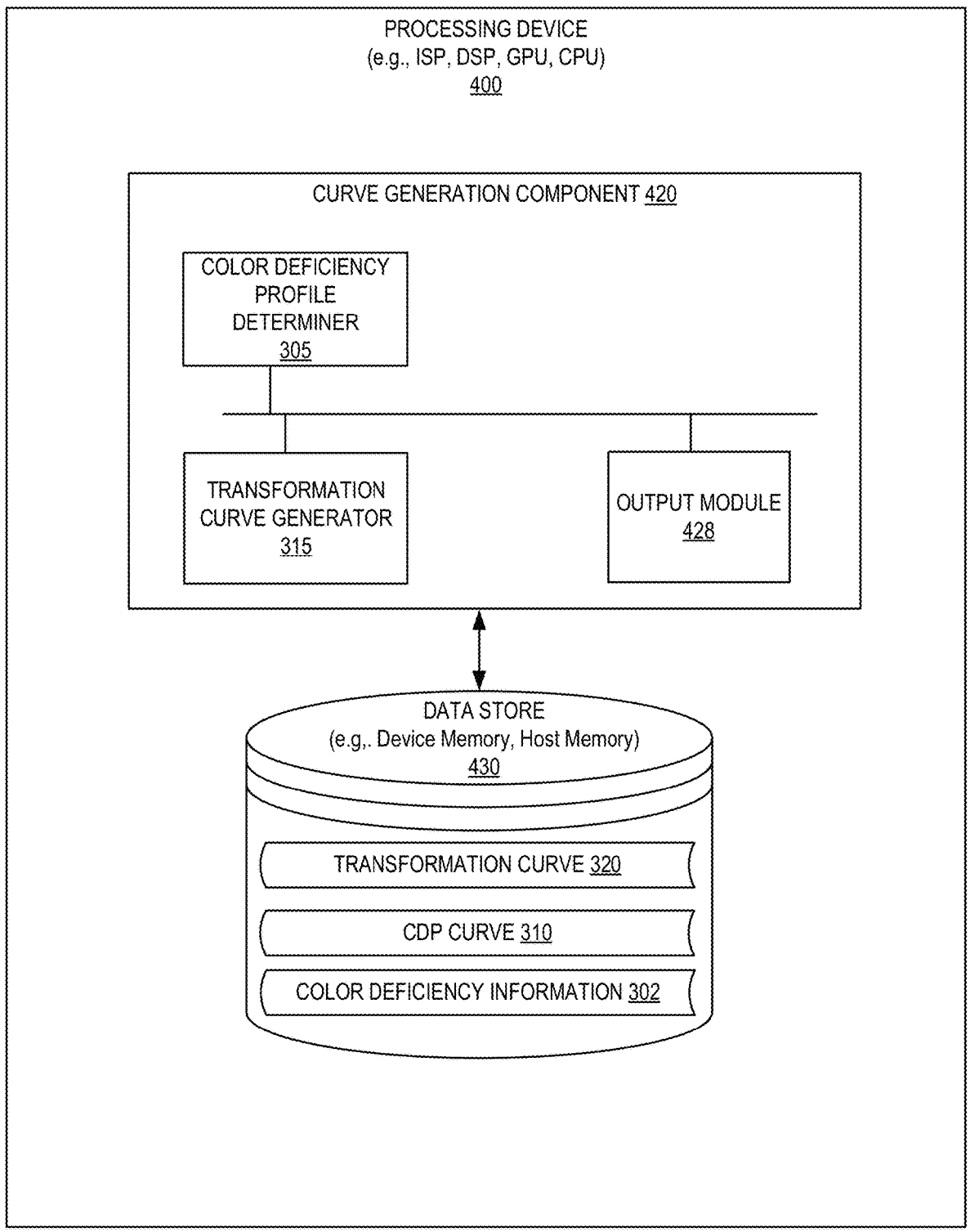
FIG. 4 is a detailed block diagram of a processing device that includes technology to generate a transformation curve, in accordance with some embodiments of the present disclosure.

FIG. 4 depicts a block diagram illustrating an exemplary processing device 400 that implements technology for generating a transformation curve, in accordance with one or more aspects of the present disclosure. Processing device 400 may be configured to receive color deficiency information 302 and to generate a CDP curve 310 and/or transformation curve 320, as discussed above in regards to FIG. 3. In the example illustrated in FIG. 4, processing device 400 may include a curve generation component 420 that includes color deficiency profile determiner 305, transformation curve generator 315, and/or an output module 428. One or more of the blocks may be logic blocks and may be implemented as hardware (e.g., integrated circuits (IC) or other circuitry), computer code (e.g., firmware, software, or other program), or a combination thereof. More or less components or modules may be included without loss of generality. For example, two or more of the components may be combined into a single component, or features of a component may be divided into two or more components.

Processing device 400 may be one or more devices that are capable of processing data of one or more images. Processing device 400 may be referred to as an image processor and may be or include one or more Image Signal Processors (ISPs), Digital Signal Processors (DSPs), Graphical Processing Units (GPUs), Central Processing Units (CPUs), Data Processing Units (DPUs), Field Programmable Gate Arrays (FPGAs), Application Specific Integrated Circuits (ASICs), other integrated circuit, or a combination thereof.

Processing device 400 may receive color deficiency information 302 that provides one or more clues as to a nature of a person's CVD. Color deficiency profile determiner 305 may generate a CDP curve as described with reference to FIG. 3. Additionally, transformation curve generator 315 may generate a transformation curve (e.g., optionally based on the CDP curve) as described with reference to FIG. 3.

Processing device 400 may include a data store 430 (e.g., a device memory, host memory, etc.) in which data can be temporarily stored before, during and/or after processing. The data store 430 may be used, for example, to store color deficiency information 302, CDP curve 310 and/or transformation curve 320.

Output module 428 may enable processing device 400 to output the CDP curve 310 and/or transformation curve 320 to one or more devices. The devices may include a display device, a data storage device, a data transmission device, another processing device, other device, or a combination thereof.

Figure 5:
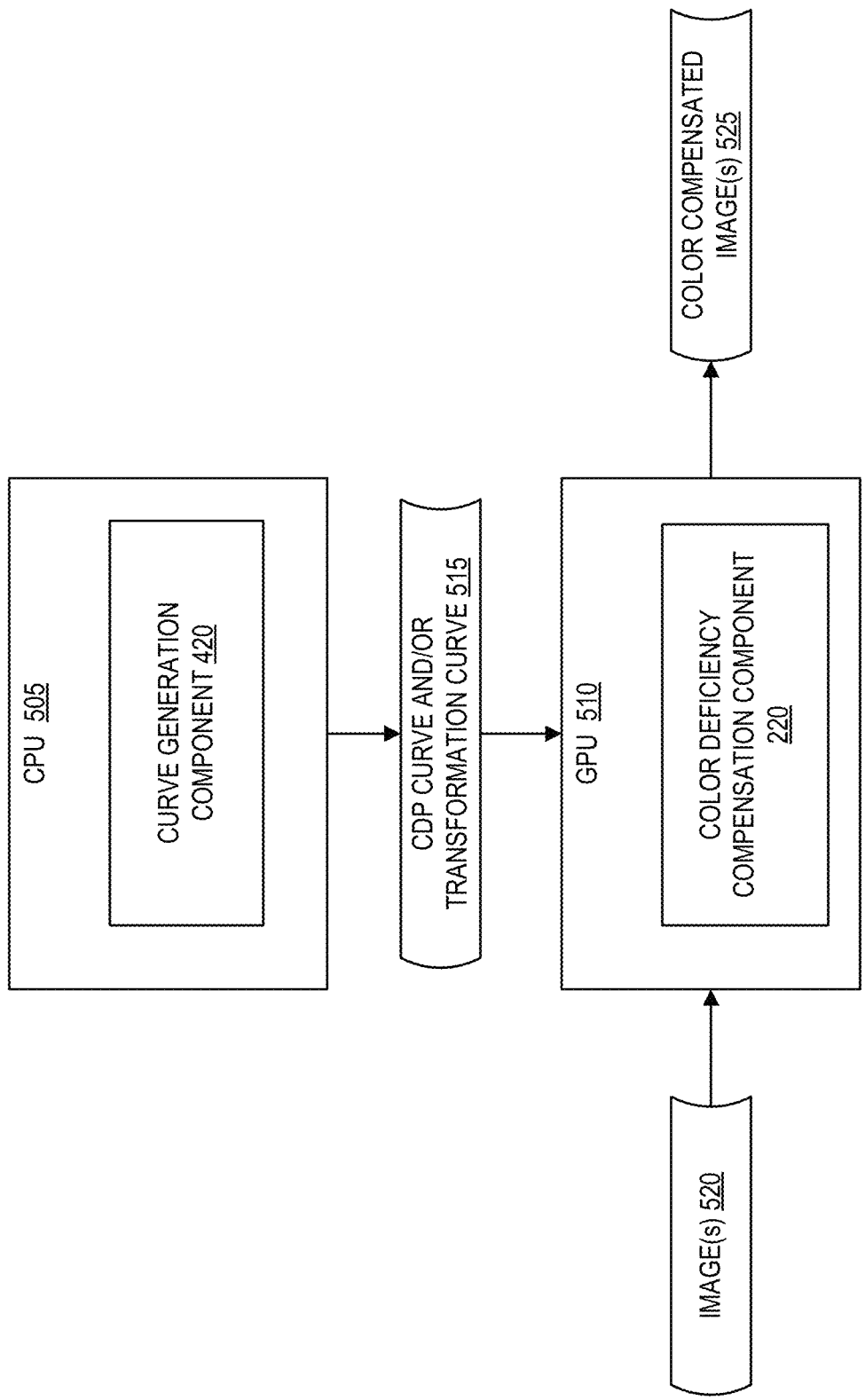
FIG. 5 is a block diagram of a system that generates a transformation curve and uses the transformation curve to perform color redistribution of images, in accordance with some embodiments of the present disclosure.

FIG. 5 is a block diagram of a system that generates a transformation curve and uses the transformation curve to perform color redistribution of images, in accordance with some embodiments of the present disclosure. The system may include a first processing device (e.g., CPU 505) with curve generation component 420 and a second processing device (e.g., GPU 510) with color deficiency compensation component 220. FIG. 5 illustrates one embodiment in which a CPU 505 and a GPU 510 are used together to perform daltonization. In other embodiments, all operations may be performed on a CPU 505, or all operations may be performed on a GPU 510 or other processing device (e.g., a DPU). CPU 505 may execute curve compensation component 420 to generate a CDP curve and/or a transformation curve 515, one or both of which may then be transmitted to GPU 510. In embodiments, the transformation and/or CDP curve may be represented as a matrix, which may be pre-computed on the CPU 505 and then transferred to GPU 510. The matrix may represent the transformation curve (or CDP curve) as well as a triangular function (or other spreading function) as discussed above, and optionally one or more additional operations. If any parameter is changed, the matrix may simply be recomputed on the CPU 505, and the updated matrix may be shared with GPU 510. Generation of the DCP curve and/or transformation curve 515 on the CPU 505 may free up GPU 510 for performing other operations.

Once GPU 510 has received the CDP curve and/or transformation curve 515, color deficiency compensation component 220 executing on GPU 510 may use such curve(s) to perform daltonization on images. GPU 510 may receive one or a stream of images 520. Color deficiency compensation component 220 may then operate on the image(s) 520 to perform daltonization, and may output color compensated image(s) 525, which may be stored, rendered, output to a display, and so on.

Figure 6:
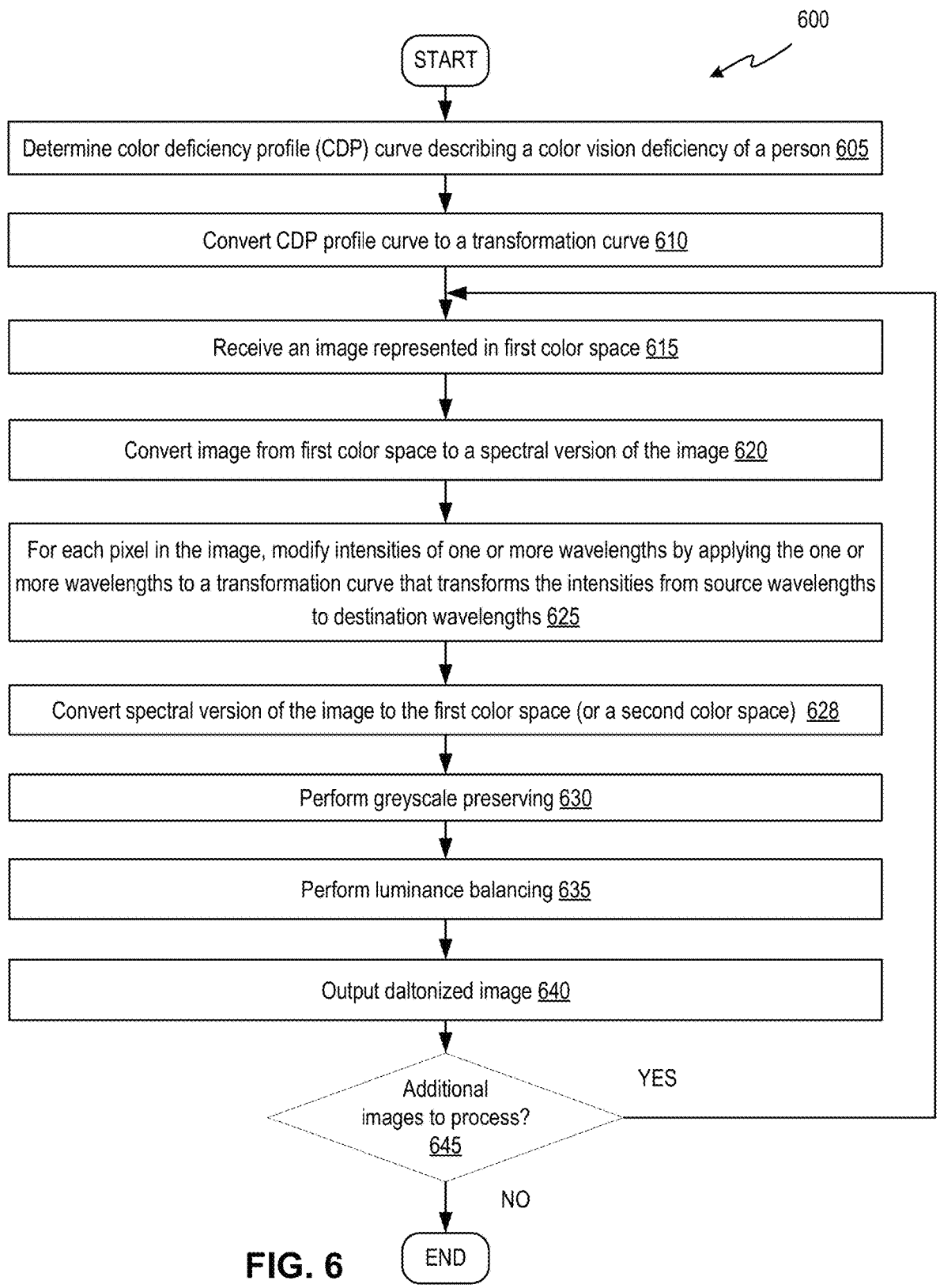
FIG. 6 is a flow chart of a method for performing color compensation of one or more images, in accordance with some embodiments of the present disclosure.

FIG. 6 is a flow chart of a method for performing color compensation (e.g., daltonization) of one or more images, in accordance with one or more aspects of the present disclosure. Method 600 and each of its individual functions, routines, subroutines, or operations may be performed by one or more processing devices (e.g., a GPU and/or CPU). For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 600, or operations thereof, may be performed by processing logic of one or more processing device (e.g., CPU 505 and/or GPU 510) and may begin at block 605. At block 605, the processing logic may determine a color deficiency profile (CDP) curve describing a color vision deficiency of a person. At block 610, processing logic may convert the CDP curve to a transformation curve. Such a conversion may be performed by integrating the CDP curve in some embodiments. In such embodiments, the transformation curve may be a remapped integration curve of the CDP. Alternatively, processing logic may directly generate or determine a transformation curve without determining or generating a CDP curve. In embodiments, operations of block 605 and block 610 are performed at a first processing device (e.g., a CPU), after which the transformation curve may be provided to a second processing device (e.g., a GPU) for use.

At block 615, processing logic (e.g., of the second processing device) receives an image represented in a first color space (e.g., an RGB image, XYZ image, etc.). At block 620, processing logic converts the image from the first color space to a spectral version of the image. At block 625, for each pixel in the image, processing logic modifies intensities of one or more wavelengths by applying the one or more wavelengths to a transformation curve (optionally represented as a matrix) that transforms the intensities from source wavelengths to destination wavelengths. Processing logic may additionally apply a spreading function (e.g., triangular function) to spread the intensity of destination wavelengths across multiple destination wavelengths, as discussed herein above.

At block 628, processing logic converts the modified spectral version of the image to the first color space (or optionally to a second color space). At block 630, processing logic may perform greyscale balancing/preserving of the image. At block 635, processing logic performs luminance balancing/preserving of the image.

At block 640, processing logic outputs a daltonized image that is color compensated, where greyscale has been preserved and luminance has been preserved. The output image may be rendered and/or sent to a display.

At block 645, processing logic determines if there are additional images to process. There may be additional images to process, for example, if the image was a frame of a computer game or video, and further frames are to be processed. If there is an additional image to process, the method may return to block 615 and a new image may be received. If there are no additional images to process, then the method may end.

In embodiments, method 600 can process an image to generate a color compensated version of the image in a very short time period, on the order of a few (e.g., 2) milliseconds. Accordingly, hundreds of images can be evaluated and modified per second. This enables method 600 to be performed on frames of a video, computer game, etc. during streaming/playing of the video, playing of the computer game, and so on.

Figure 7:
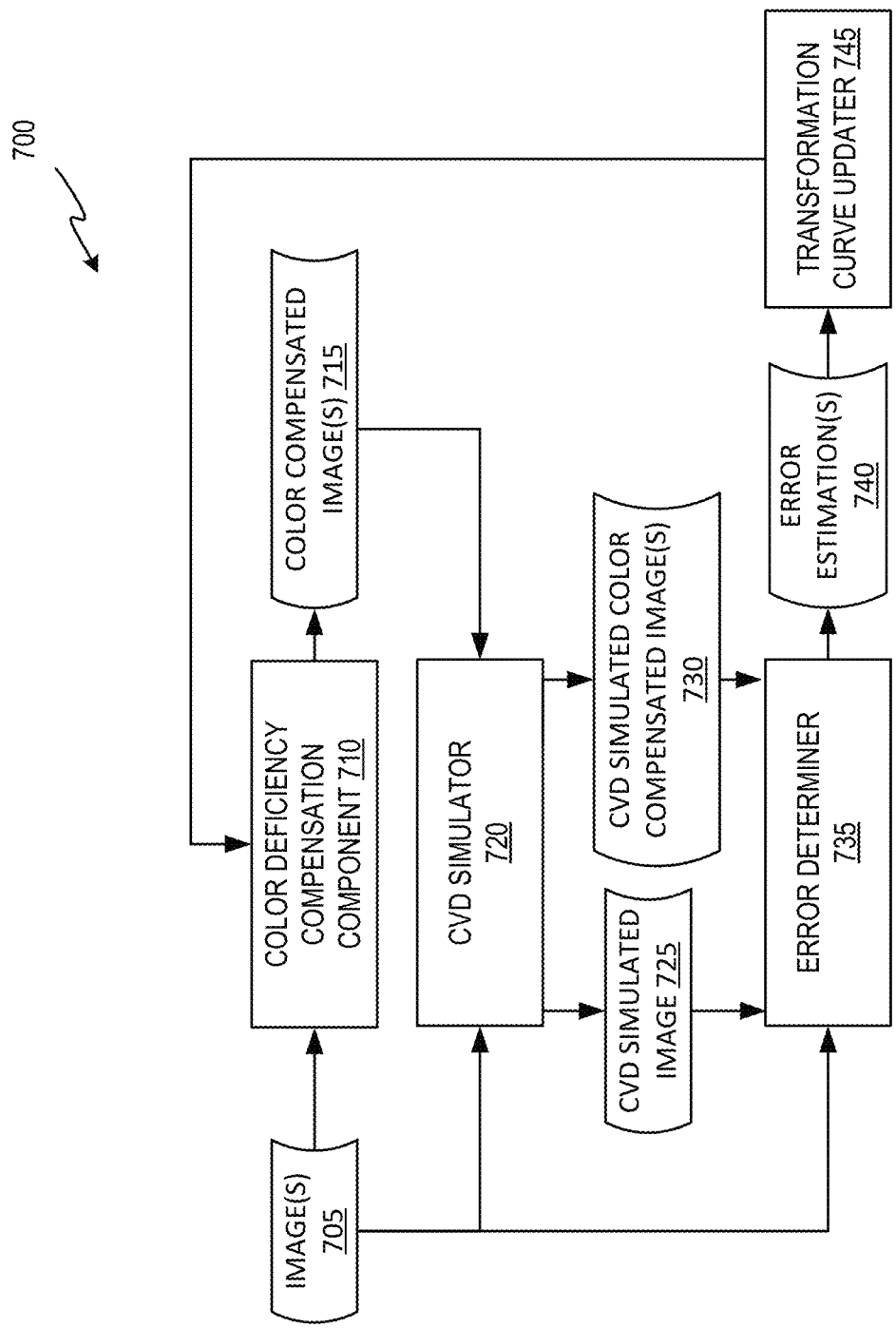
FIG. 7 illustrates an example computing environment that includes images and technology to generate a color deficiency profile (CDP) curve and/or a transformation curve optimized for persons having a CVD, in accordance with some embodiments of the present disclosure.

FIG. 7 illustrates an example computing environment 700 that includes images and technology to generate a color deficiency profile (CDP) curve and/or a transformation curve optimized for persons having a CVD, in accordance with some embodiments of the present disclosure. The computing environment 700 includes image(s) 705, a color deficiency compensation component 710, a CVD simulator 720, an error determiner 735, and a transformation curve updater 745 in some embodiments. Computing environment 700 may perform one or more techniques such as simulated annealing to generate a CDP curve and/or transformation curve that accurately defines a color vision deficiency (CVD) of a person and/or that modifies intensities of wavelengths to compensate for such a CVD.

In some embodiments, the computing environment 700 determines a CDP curve to use by perturbing an initial CDP curve for one or more wavelengths (e.g., with random or pseudorandom perturbations), and then estimating a quality metric associated with the initial CDP curve and the perturbed CDP curve. The quality metric may be a function of how an image would be viewed by a person with the CVD when it has been modified by a transformation curve generated from the CDP curve. Processing logic may replace the initial CDP curve with the perturbed CDP curve responsive to determining that the perturbed CDP curve is superior to (e.g., has a higher quality metric value than) the initial CDP curve.

In some embodiments, the computing environment 700 determines a transformation curve to use by perturbing an initial transformation curve for one or more wavelengths, and then estimating a quality metric associated with the initial transformation curve and the perturbed transformation curve. The quality metric may be a function of how an image would be viewed by a person with the CVD when it has been modified by the transformation curve. Processing logic may replace the initial transformation curve with the perturbed transformation curve responsive to determining that the perturbed transformation curve is superior to (e.g., has a higher quality metric value than) the initial transformation curve.

In one embodiment, color deficiency compensation component 710 receives an image and performs daltonization on the image using a transformation curve (which may or may not be based on a CDP curve), and outputs a color compensated image 715. In embodiments, processing logic generates multiple color compensated images 715, where each of the color compensated images is generated based on a slightly different CDP curve and/or transformation curve. For example, a first color compensated image may be generated based on an initial CDP curve and/or an initial transformation curve, and a second color compensated image may be generated based on a perturbed CDP curve and/or a perturbed transformation curve. For each of the original image 705 and/or color compensated image 715, CVD simulator 720 performs simulation of the input images 705, 715 to generate CVD simulated image 725 and CVD simulated color compensated image(s) 730. Each CVD simulated image 725, 730 is a version of the image as it would be viewed by a person with the CVD.

For image 705 and/or for each color compensated image 715, error determiner 735 determines an error based on a difference between the image 705, 715 and the CVD simulated version of the image 725, 730. The difference may be a difference in luminance, a difference in contrast, a difference in naturalness (a metric representing a degree of correspondence between an image and human perception of reality), and/or some other difference metric. Error determiner 735 then outputs error estimations 740. Transformation curve updater 745 determines which of the CVD curves and/or transformation curves generated color compensated image(s) with the lowest error. If a perturbed CDP curve and/or transformation curve yielded a color compensated image 715 that had a lowest error, then that perturbed CDP curve and/or transformation curve may replace the initial CDP curve and/or transformation curve. Thus, transformation curve updater 745 may update the previous best CDP curve/transformation curve with the new best CDP curve/transformation curve. This process may be repeated until no further reductions in error are detected by further perturbations of the CDP curve and/or transformation curve, or until further reductions in error are below a threshold value.

Figure 8:
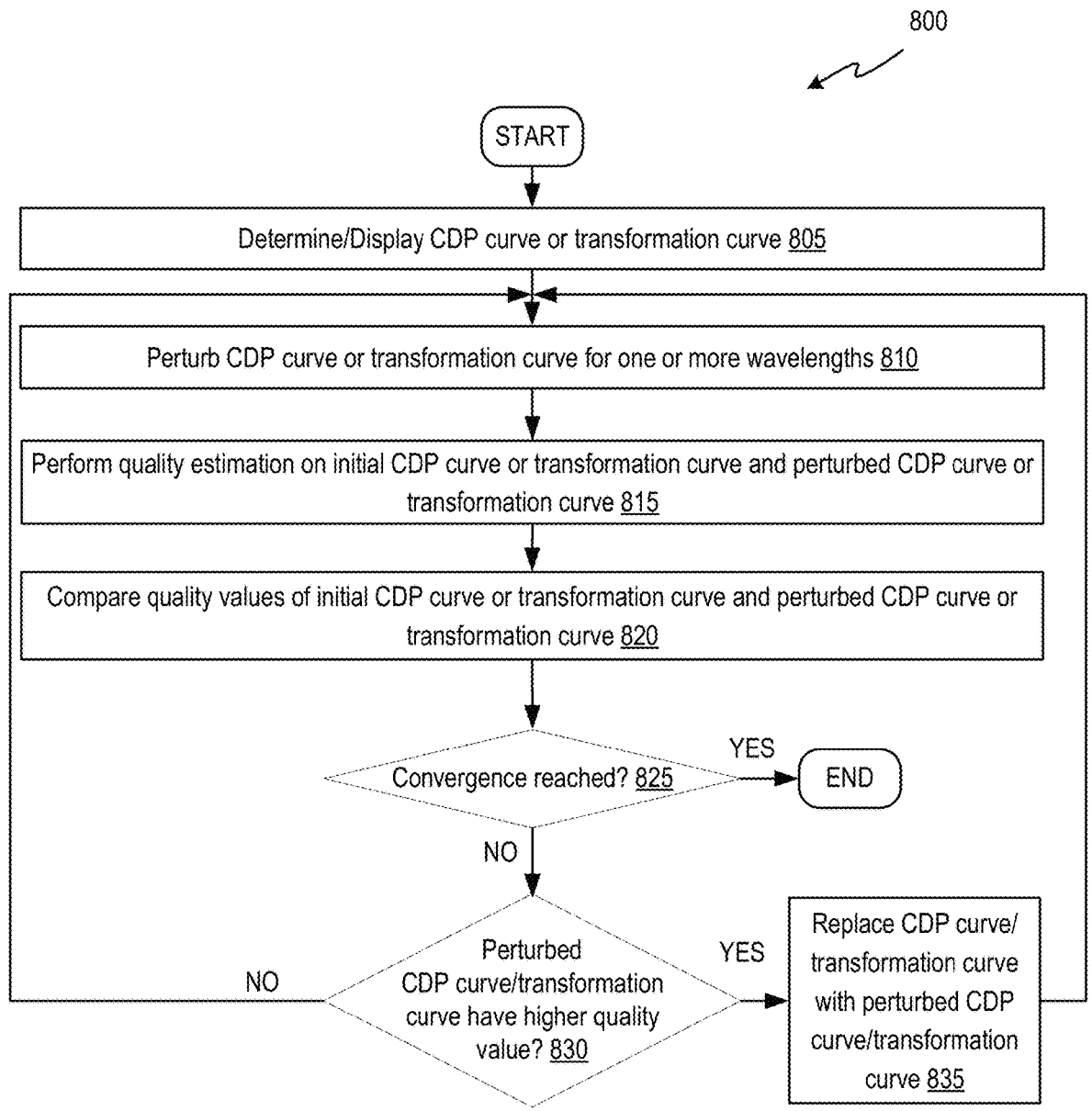
FIG. 8 is a flow chart of a method for determining a CDP curve and/or a transformation curve, in accordance with some embodiments of the present disclosure.

FIG. 8 is a flow chart of a method 800 for determining a CDP curve and/or a transformation curve, in accordance with some embodiments of the present disclosure. At block 805 of method 800, processing logic determines and/or displays a CDP curve and/or a transformation curve. At block 810, processing logic perturbs the CDP curve and/or transformation curve for one or more wavelengths. At block 815, processing logic performs a quality estimation on the initial CDP curve and/or transformation curve and on the perturbed CDP curve and/or transformation curve. The quality estimation may be performed as described with reference to FIG. 7.

At block 820, processing logic compares quality values (e.g., error values or other image metric values) of the initial CDP curve/transformation curve and of the perturbed CDP curve/transformation curve. At block 825, processing logic determines whether convergence has been reached. Convergence may be reached when there is no difference between the quality values and/or the difference between quality values is less than a threshold amount (and optionally there has been no difference in quality values and/or the differences in quality values has been less than the threshold amount for n number of previous iterations of perturbing the CDP/transformation curve. If convergence is reached, the method ends. If convergence has not been reached, the method continues to block 830.

At block 830, processing logic determines whether the perturbed CDP curve/transformation curve has a higher quality value (e.g., is superior) or whether the unperturbed (previously set) CDP curve/transformation curve has a higher quality value (e.g., is superior). If the previously set CDP curve/transformation curve has a higher quality value, the method returns to block 810 and the previously set CDP curve/transformation curve is again perturbed and that new perturbation is assessed. If the perturbed CPD curve/transformation curve has a higher quality value, the method proceeds to block 835. At block 835, processing logic replaces the previously set CDP curve/transformation curve with the perturbed CDP curve/transformation curve, which becomes the new set curve. The method then returns to block 810, and the new set CDP curve/transformation curve is perturbed and assessed. This process may repeat until convergence is reached at block 825.

Figure 9:
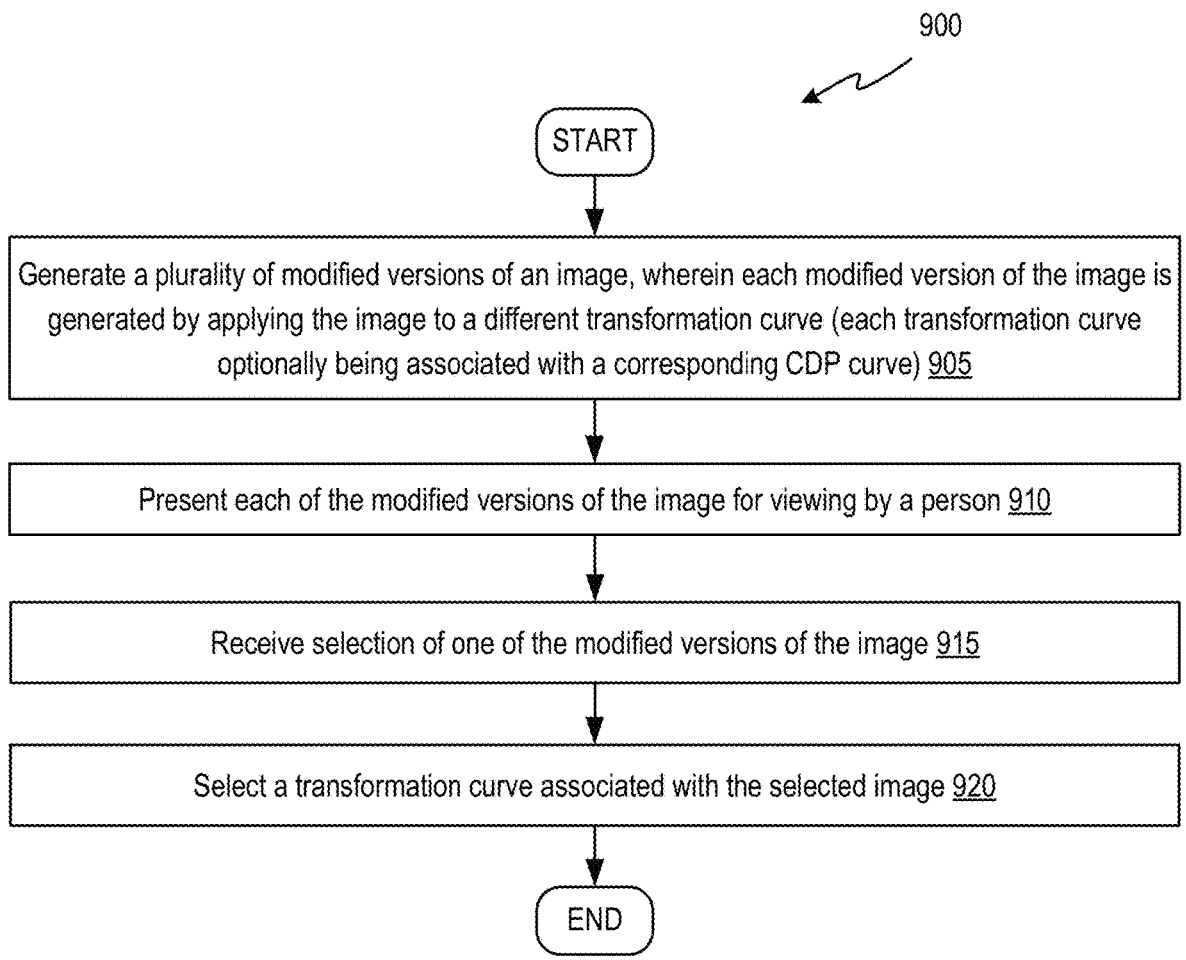
FIG. 9 is a flow chart of a method for determining a CDP curve and/or a transformation curve, in accordance with some embodiments of the present disclosure.

FIG. 9 is a flow chart of a method 900 for determining a CDP curve and/or a transformation curve, in accordance with some embodiments of the present disclosure. At block 905 of method 900, processing logic generates a plurality of modified versions of an image. Each modified version of the image is generated by applying the image to a different transformation curve. Each transformation curve may have been generated based on an associated CDP curve in some embodiments.

At block 910, processing logic presents each modified version of the image for viewing by a person with a CVD. At block 915, processing logic receives a selection of one of the modified versions of the image. The selection may be made by a person viewing the images (e.g., by clicking on the image on a display via a graphical user interface). The person may be instructed to select the image that looks the best to them, the image for which they are able to best discern certain features, and so on. At block 920, processing logic then selects a transformation curve (and optionally a CDP curve) associated with the selected image.

Figure 15:
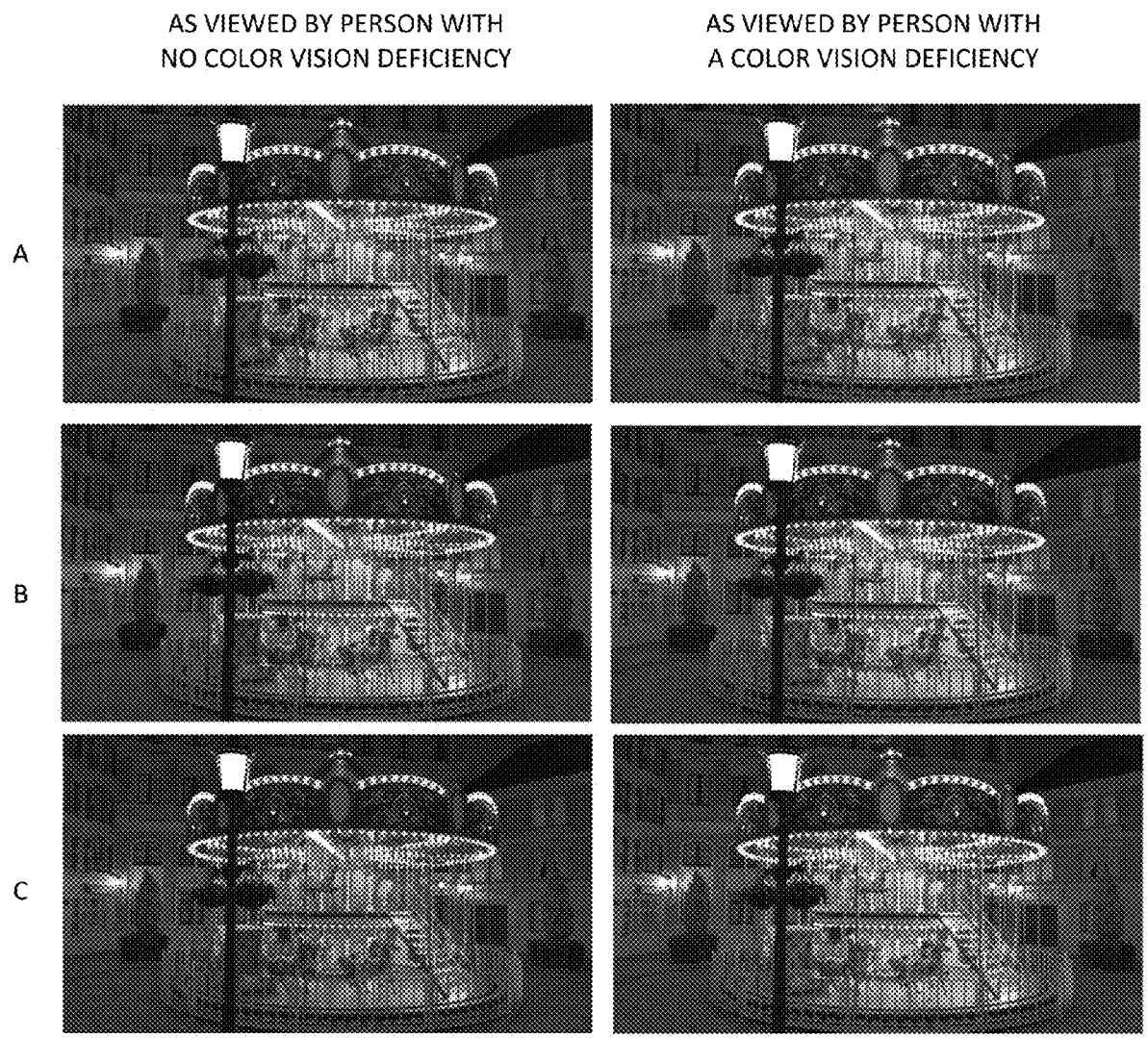
FIG. 15 illustrates an original image, a first color compensated image as compensated according to the second example CDP curve of FIG. 14B, and a second color compensated image as compensated according to the third example CDP curve of FIG. 14C, as viewed by a person with no color deficiency and as viewed by a person with a color vision deficiency, in accordance with some embodiments of the present disclosure.

As set forth above, FIG. 14B illustrates a second example CDP curve and FIG. 14C illustrates a third example CDP curve. FIG. 15 illustrates an original image (image A), a first color compensated image (image B) as compensated according to the second example CDP curve of FIG. 14B, and a second color compensated image (image C) as compensated according to the third example CDP curve of FIG. 14C, as viewed by a person with no color deficiency (left column) and as viewed by a person with a color vision deficiency (right column), in accordance with some embodiments of the present disclosure.

Figure 16:
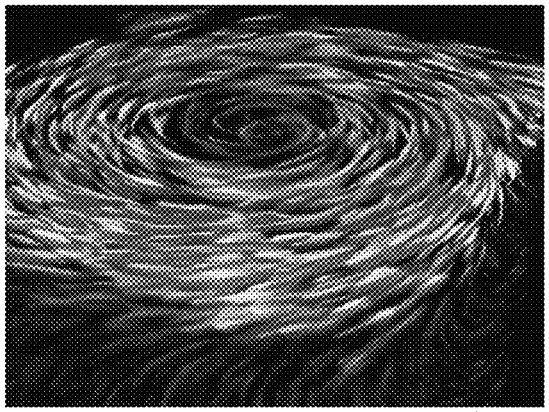
FIG. 16 illustrates an original image, a first color compensated image as compensated according to the second example CDP curve of FIG. 14B, and a second color compensated image as compensated according to the third example CDP curve of FIG. 14C, as viewed by a person with no color deficiency and as viewed by a person with a color vision deficiency, in accordance with some embodiments of the present disclosure.
Figure 16:
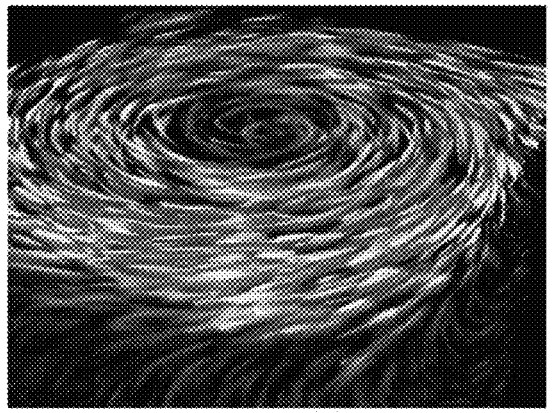
Figure 16:
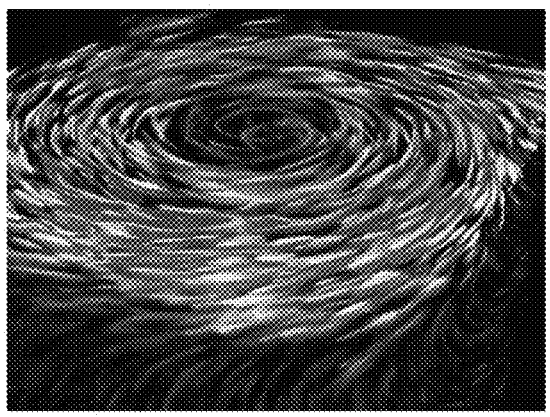
Figure 16:
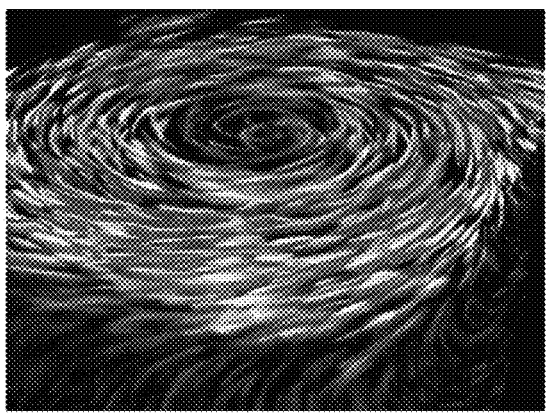
Figure 16:
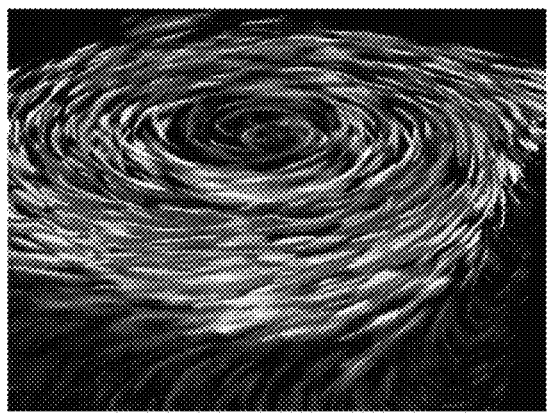
Figure 16:
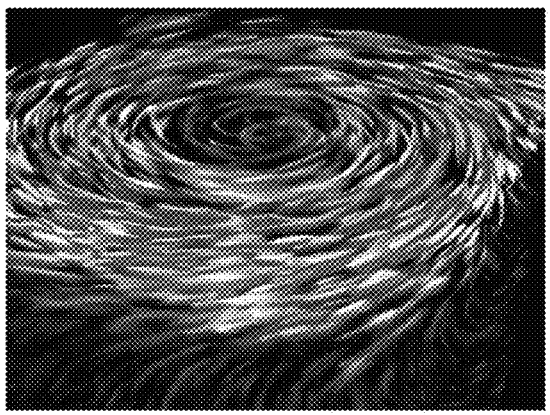

FIG. 16 illustrates an original image (image D), a first color compensated image (image E) as compensated according to the second example CDP curve of FIG. 14B, and a second color compensated image (image F) as compensated according to the third example CDP curve of FIG. 14C, as viewed by a person with no color deficiency (left column) and as viewed by a person with a color vision deficiency (right column), in accordance with some embodiments of the present disclosure.

As shown, the second example CDP curve of FIG. 14B did not help the person with the CVD to better distinguish between colors in the image, but the third example CDP curve of FIG. 14C did help the person with the CVD to better distinguish between colors.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 17:
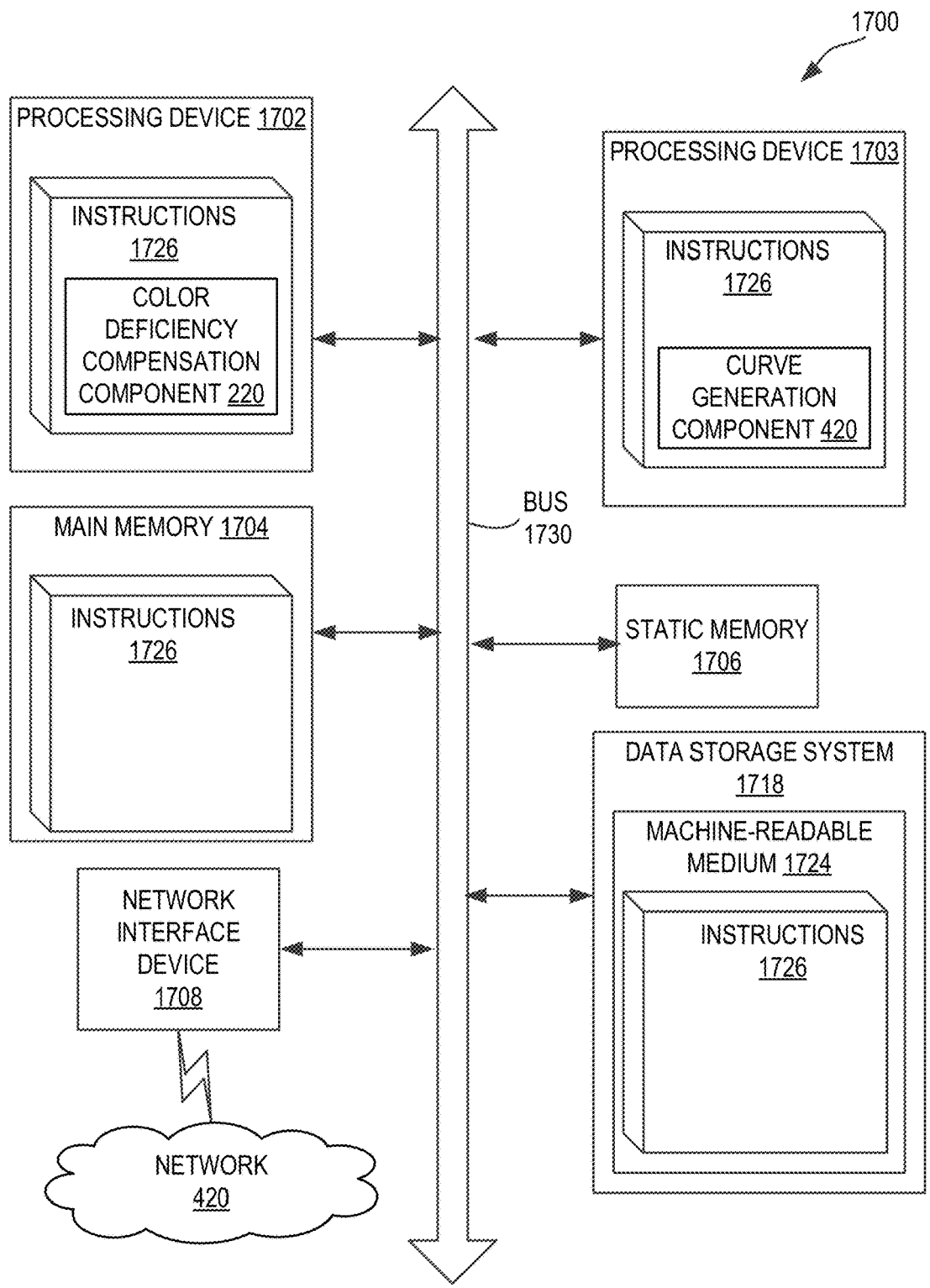
FIG. 17 is a block diagram of an example computer system in which embodiments of the present disclosure can operate.

FIG. 17 illustrates an example machine of a computer system 1700 within which a set of instructions, for causing the machine to perform any one or more of the methodologies discussed herein, can be executed. In some embodiments, the computer system 1700 can be a computing device that includes a first and second processor, each optionally with a cache controller, a memory controller, or combination thereof. In embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1700 includes a processing device 1702, a processing device 1703, a main memory 1704 (e.g., read-only memory (ROM), flash memory, dynamic random access memory (DRAM) such as synchronous DRAM (SDRAM) or Rambus DRAM (RDRAM), etc.), a static memory 1706 (e.g., flash memory, static random access memory (SRAM), etc.), and/or a data storage system 1718, which communicate with each other via a bus 1730.

Processing device 1702 and 1703 may each represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1702, 1703 can also be one or more special-purpose processing devices such as a data processing unit (DPU), an application specific integrated circuit (ASIC), a field programmable gate array (FPGA), a digital signal processor (DSP), graphical processing unit (GPU), network processor, or the like. The processing device 1702, 1703 is configured to execute instructions 1726 for performing the operations and steps discussed herein. The computer system 1700 can further include a network interface device 1708 to communicate over the network 1720.

In one embodiment, processing device 1702 is a CPU and processing device 1703 is a GPU.

The data storage system 1718 can include a machine-readable storage medium 1724 (also known as a non-transitory computer-readable medium) on which is stored one or more sets of instructions 1726 or software embodying any one or more of the methodologies or functions described herein. The instructions 1726 can also reside, completely or at least partially, within the main memory 1704 and/or within the processing device 1702,1703 during execution thereof by the computer system 1700, the main memory 1704 and the processing device 1702, 1703 also constituting machine-readable storage media. The machine-readable storage medium 1724, data storage system 1718, and/or main memory 1704 can correspond to data store 230 of FIG. 2 and/or data store 430 of FIG. 4.

In one embodiment, the instructions 1726 include instructions to implement functionality corresponding to the color deficiency compensation component 220 of FIG. 2 and/or to the curve generation component 420 of FIG. 4. While the machine-readable storage medium 424 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Computer Systems

Figure 18:
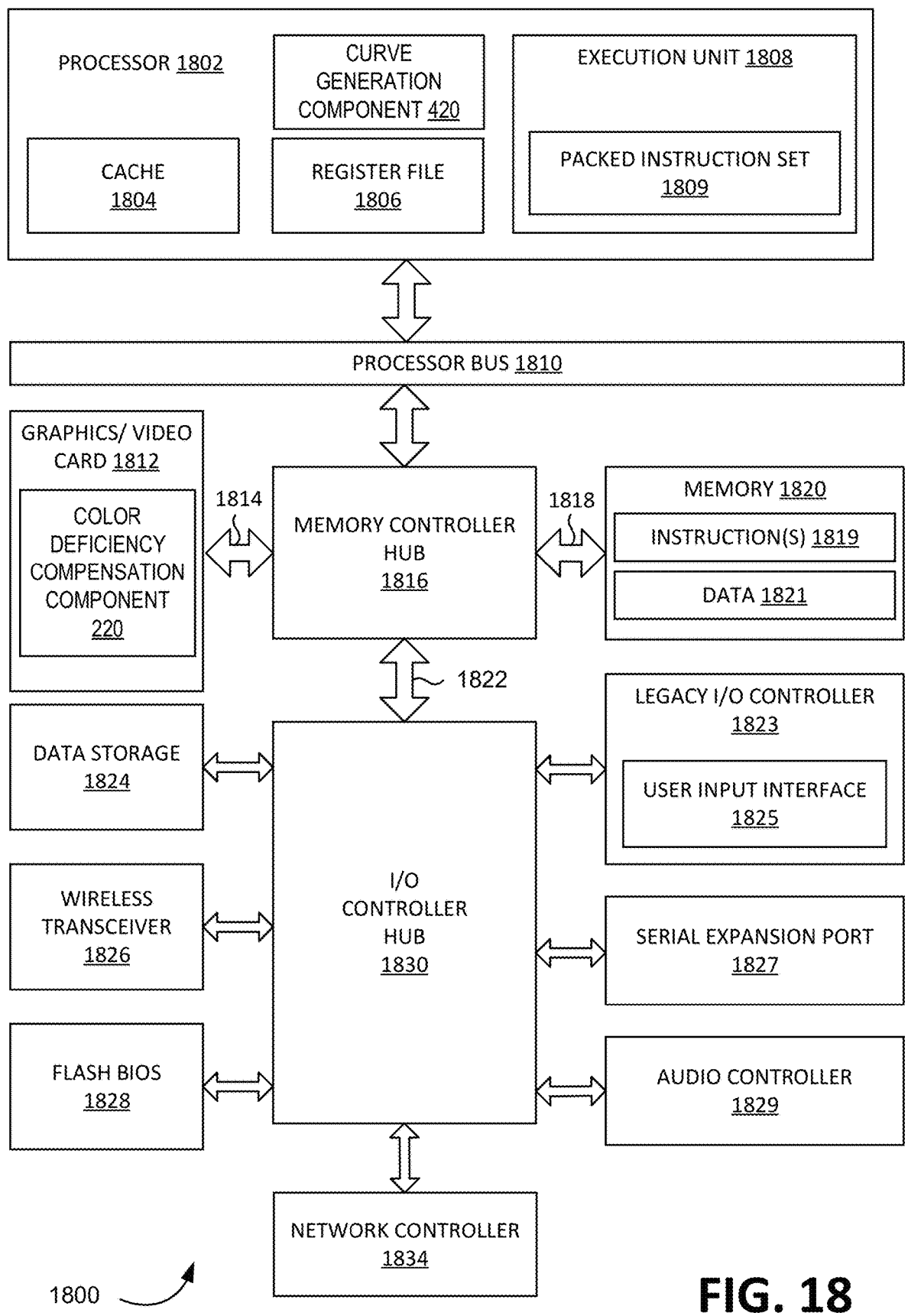
FIG. 18 illustrates a computer system, according to at least one embodiment.

FIG. 18 is a block diagram illustrating an exemplary computer system, which may be a system with interconnected devices and components, a system-on-a-chip (SOC) or some combination thereof 1800 formed with a processor that may include execution units to execute an instruction, according to at least one embodiment. In at least one embodiment, computer system 1800 may include, without limitation, a component, such as a processor 1802 to employ execution units including logic to perform algorithms for process data, in accordance with present disclosure, such as in embodiment described herein. In at least one embodiment, computer system 1800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1800 may include, without limitation, processor 1802 that may include, without limitation, one or more execution units 1808 to perform machine learning model training and/or inferencing according to techniques described herein. In at least one embodiment, computer system 1800 is a single processor desktop or server system, but in another embodiment computer system 1800 may be a multiprocessor system. In at least one embodiment, processor 1802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1802 may be coupled to a processor bus 1810 that may transmit data signals between processor 1802 and other components in computer system 1800.

In at least one embodiment, processor 1802 may include, without limitation, a Level 1 ("L1") internal cache memory ("cache") 1804. In at least one embodiment, processor 1802 may have a single internal cache or multiple levels of internal cache. In at least one embodiment, cache memory may reside external to processor 1802. Other embodiments may also include a combination of both internal and external caches depending on particular implementation and needs. In at least one embodiment, register file 1806 may store different types of data in various registers including, without limitation, integer registers, floating point registers, status registers, and instruction pointer register.

In at least one embodiment, execution unit 1808, including, without limitation, logic to perform integer and floating point operations, also resides in processor 1802. In at least one embodiment, processor 1802 may also include a microcode ("ucode") read only memory ("ROM") that stores microcode for certain macro instructions. In at least one embodiment, execution unit 1808 may include logic to handle a packed instruction set 1809. In at least one embodiment, by including packed instruction set 1809 in an instruction set of a general-purpose processor 1802, along with associated circuitry to execute instructions, operations used by many multimedia applications may be performed using packed data in a general-purpose processor 1802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1808 may also be used in microcontrollers, embedded processors, graphics devices, DSPs, and other types of logic circuits. In at least one embodiment, computer system 1800 may include, without limitation, a memory 1820. In at least one embodiment, memory 1820 may be implemented as a Dynamic Random Access Memory ("DRAM") device, a Static Random Access Memory ("SRAM") device, flash memory device, or other memory device. In at least one embodiment, memory 1820 may store instruction(s) 1819 and/or data 1821 represented by data signals that may be executed by processor 1802.

In at least one embodiment, system logic chip may be coupled to processor bus 1810 and memory 1820. In at least one embodiment, system logic chip may include, without limitation, a memory controller hub ("MCH") 1816, and processor 1802 may communicate with MCH 1816 via processor bus 1810. In at least one embodiment, MCH 1816 may provide a high bandwidth memory path 1818 to memory 1820 for instruction and data storage and for storage of graphics commands, data and textures. In at least one embodiment, MCH 1816 may direct data signals between processor 1802, memory 1820, and other components in computer system 1800 and to bridge data signals between processor bus 1810, memory 1820, and a system I/O 1822. In at least one embodiment, system logic chip may provide a graphics port for coupling to a graphics controller. In at least one embodiment, MCH 1816 may be coupled to memory 1820 through a high bandwidth memory path 1818 and graphics/video card 1812 may be coupled to MCH 1816 through an Accelerated Graphics Port ("AGP") interconnect 1814.

In at least one embodiment, computer system 1800 may use system I/O 1822 that is a proprietary hub interface bus to couple MCH 1816 to I/O controller hub ("ICH") 1830. In at least one embodiment, ICH 1830 may provide direct connections to some I/O devices via a local I/O bus. In at least one embodiment, local I/O bus may include, without limitation, a high-speed I/O bus for connecting peripherals to memory 1820, chipset, and processor 1802. Examples may include, without limitation, an audio controller 1829, a firmware hub ("flash BIOS") 1828, a wireless transceiver 1826, a data storage 1824, a legacy I/O controller 1823 containing user input and keyboard interfaces 1825, a serial expansion port 1827, such as Universal Serial Bus ("USB"), and a network controller 1834. Data storage 1824 may comprise a hard disk drive, a floppy disk drive, a CD-ROM device, a flash memory device, or other mass storage device.

In at least one embodiment, FIG. 18 illustrates a system, which includes interconnected hardware devices or "chips," whereas in other embodiments, FIG. 18 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1800 are interconnected using compute express link (CXL) interconnects.

In embodiments, processor 1802 may include curve generation component 420, and graphics/video card 1812 may include color deficiency compensation component 220, each of which may be implemented in hardware, firmware, software, or a combination thereof.

Figure 19:
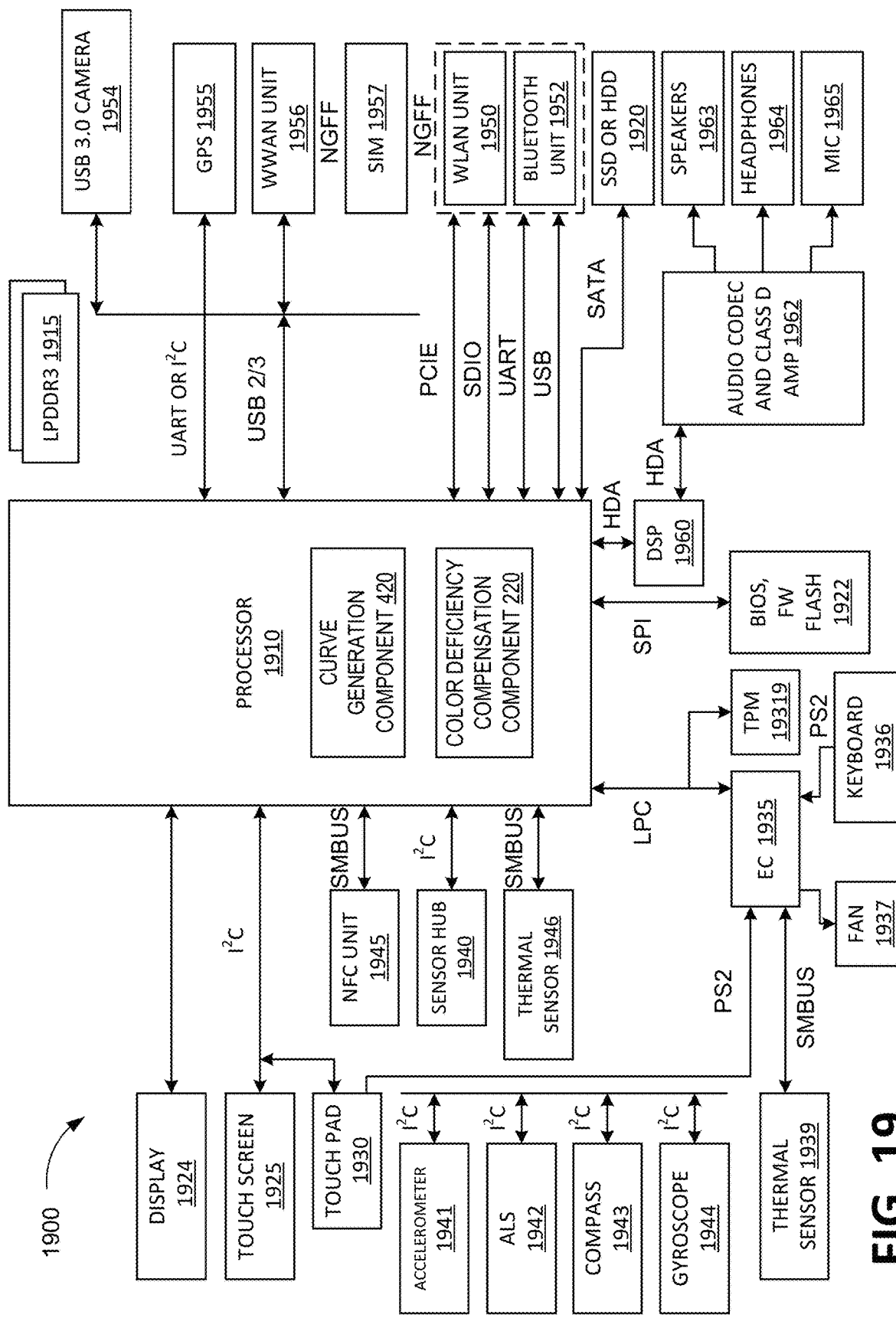
FIG. 19 illustrates a computer system, according to at least one embodiment.

FIG. 19 is a block diagram illustrating an electronic device 1900 for utilizing a processor 1910, according to at least one embodiment. In at least one embodiment, electronic device 1900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1900 may include, without limitation, processor 1910 communicatively coupled to any suitable number or kind of components, peripherals, modules, or devices. In at least one embodiment, processor 1910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 19 illustrates a system, which includes interconnected hardware devices or "chips," whereas in other embodiments, FIG. 19 may illustrate an exemplary System on a Chip ("SoC"). In at least one embodiment, devices illustrated in FIG. 19 may be interconnected with proprietary interconnects, standardized interconnects (e.g., PCIe) or some combination thereof. In at least one embodiment, one or more components of FIG. 19 are interconnected using compute express link (CXL) interconnects.

In at least one embodiment, FIG. 19 may include a display 1924, a touch screen 1925, a touch pad 1930, a Near Field Communications unit ("NFC") 1945, a sensor hub 1940, a thermal sensor 1946, an Express Chipset ("EC") 1935, a Trusted Platform Module ("TPM") 1938, BIOS/firmware/flash memory ("BIOS, FW Flash") 1922, a DSP 1960, a drive 1920 such as a Solid State Disk ("SSD") or a Hard Disk Drive ("HDD"), a wireless local area network unit ("WLAN") 1950, a Bluetooth unit 1952, a Wireless Wide Area Network unit ("WWAN") 1956, a Global Positioning System (GPS) 1955, a camera ("USB 3.0 camera") 1954 such as a USB 3.0 camera, and/or a Low Power Double Data Rate ("LPDDR") memory unit ("LPDDR3") 1915 implemented in, for example, LPDDR3 standard. These components may each be implemented in any suitable manner.

In at least one embodiment, other components may be communicatively coupled to processor 1910 through components discussed above. In at least one embodiment, an accelerometer 1941, Ambient Light Sensor ("ALS") 1942, compass 1943, and a gyroscope 1944 may be communicatively coupled to sensor hub 1940. In at least one embodiment, thermal sensor 1939, a fan 1937, a keyboard 1936, and a touch pad 1930 may be communicatively coupled to EC 1935. In at least one embodiment, speaker 1963, headphones 1964, and microphone ("mic") 1965 may be communicatively coupled to an audio unit ("audio codec and class d amp") 1962, which may in turn be communicatively coupled to DSP 1960. In at least one embodiment, audio unit 1962 may include, for example and without limitation, an audio coder/decoder ("codec") and a class D amplifier. In at least one embodiment, SIM card ("SIM") 1957 may be communicatively coupled to WWAN unit 1956. In at least one embodiment, components such as WLAN unit 1950 and Bluetooth unit 1952, as well as WWAN unit 1956 may be implemented in a Next Generation Form Factor ("NGFF").

In embodiments, processor 1910 may include curve generation component 420 and/or color deficiency compensation component 220, each of which may be implemented in hardware, firmware, software, or a combination thereof.

Figure 20:
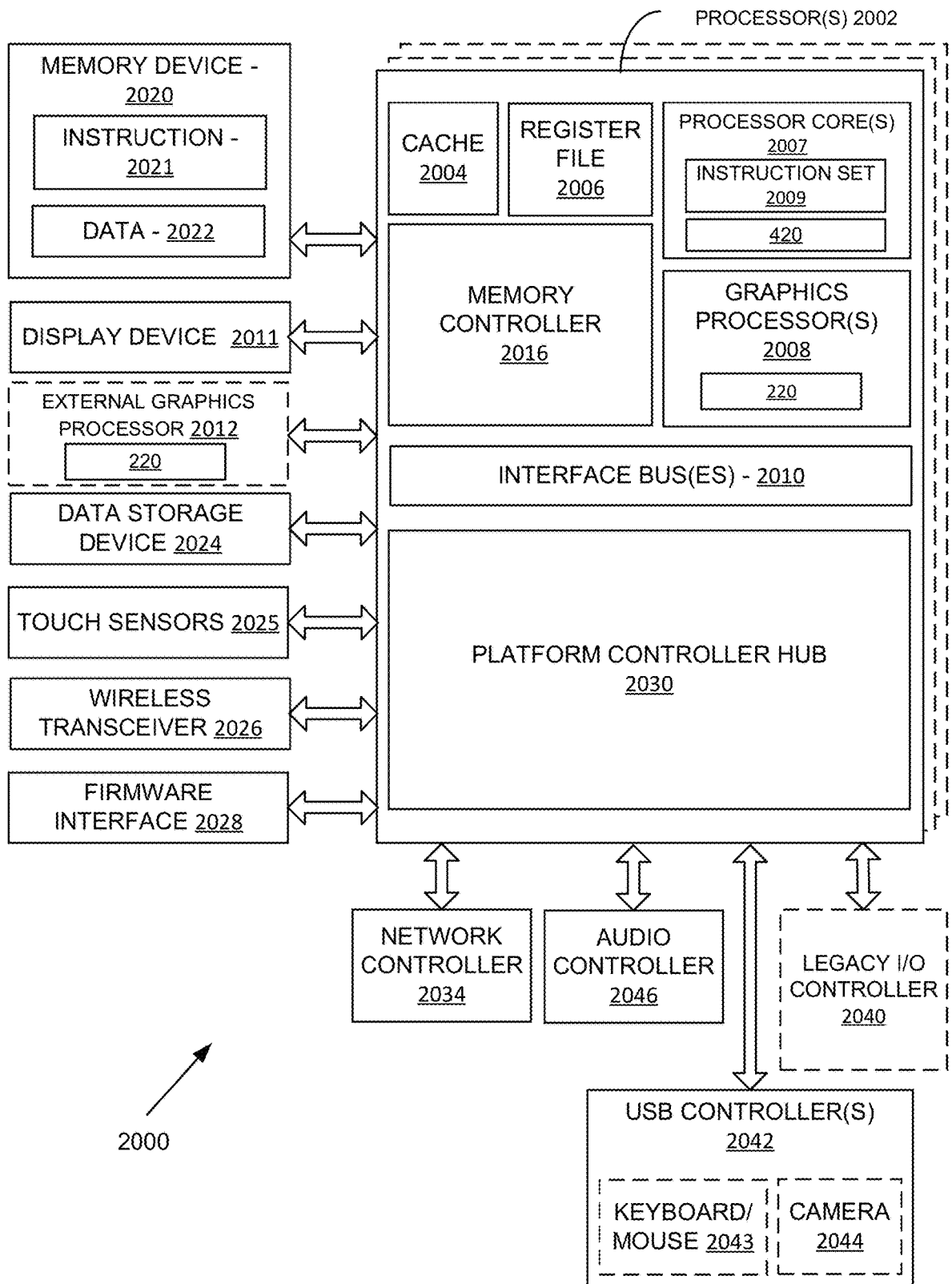
FIG. 20 illustrates a computer system, according to one or more embodiments.

FIG. 20 is a block diagram of a processing system, according to at least one embodiment. In at least one embodiment, system 2000 includes one or more processors 2002 and one or more graphics processors 2008, and may be a single processor desktop system, a multiprocessor workstation system, or a server system having a large number of processors 2002 or processor cores 2007. In at least one embodiment, system 2000 is a processing platform incorporated within a system-on-a-chip (SoC) integrated circuit for use in mobile, handheld, or embedded devices.

In at least one embodiment, system 2000 can include, or be incorporated within a server-based gaming platform, a game console, including a game and media console, a mobile gaming console, a handheld game console, or an online game console. In at least one embodiment, system 2000 is a mobile phone, smart phone, tablet computing device or mobile Internet device. In at least one embodiment, system 2000 can also include, couple with, or be integrated within a wearable device, such as a smart watch wearable device, smart eyewear device, augmented reality device, or virtual reality device. In at least one embodiment, system 2000 is a television or set top box device having one or more processors 2002 and a graphical interface generated by one or more graphics processors 2008.

In at least one embodiment, one or more processors 2002 each include one or more processor cores 2007 to process instructions which, when executed, perform operations for system and user software. In at least one embodiment, each of one or more processor cores 2007 is configured to process a specific instruction set 2009. In at least one embodiment, instruction set 2009 may facilitate Complex Instruction Set Computing (CISC), Reduced Instruction Set Computing (RISC), or computing via a Very Long Instruction Word (VLIW). In at least one embodiment, processor cores 2007 may each process a different instruction set 2009, which may include instructions to facilitate emulation of other instruction sets. In at least one embodiment, processor core 2007 may also include other processing devices, such a Digital Signal Processor (DSP).

In at least one embodiment, processor 2002 includes cache memory 2004. In at least one embodiment, processor 2002 can have a single internal cache or multiple levels of internal cache. In at least one embodiment, cache memory is shared among various components of processor 2002. In at least one embodiment, processor 2002 also uses an external cache (e.g., a Level-3 (L3) cache or Last Level Cache (LLC)) (not shown), which may be shared among processor cores 2007 using known cache coherency techniques. In at least one embodiment, register file 2006 is additionally included in processor 2002 which may include different types of registers for storing different types of data (e.g., integer registers, floating point registers, status registers, and an instruction pointer register). In at least one embodiment, register file 2006 may include general-purpose registers or other registers.

In at least one embodiment, one or more processor(s) 2002 are coupled with one or more interface bus(es) 2010 to transmit communication signals such as address, data, or control signals between processor 2002 and other components in system 2000. In at least one embodiment, interface bus 2010, in one embodiment, can be a processor bus, such as a version of a Direct Media Interface (DMI) bus. In at least one embodiment, interface bus 2010 is not limited to a DMI bus, and may include one or more Peripheral Component Interconnect buses (e.g., PCI, PCI Express), memory busses, or other types of interface busses. In at least one embodiment processor(s) 2002 include an integrated memory controller 2016 and a platform controller hub 2030. In at least one embodiment, memory controller 2016 facilitates communication between a memory device and other components of system 2000, while platform controller hub (PCH) 2030 provides connections to I/O devices via a local I/O bus.

In at least one embodiment, memory device 2020 can be a dynamic random access memory (DRAM) device, a static random access memory (SRAM) device, flash memory device, phase-change memory device, or some other memory device having suitable performance to serve as process memory. In at least one embodiment memory device 2020 can operate as system memory for system 2000, to store data 2022 and instructions 2021 for use when one or more processors 2002 executes an application or process. In at least one embodiment, memory controller 2016 also couples with an optional external graphics processor 2012, which may communicate with one or more graphics processors 2008 in processors 2002 to perform graphics and media operations. In at least one embodiment, a display device 2011 can connect to processor(s) 2002. In at least one embodiment display device 2011 can include one or more of an internal display device, as in a mobile electronic device or a laptop device or an external display device attached via a display interface (e.g., DisplayPort, etc.). In at least one embodiment, display device 2011 can include a head mounted display (HMD) such as a stereoscopic display device for use in virtual reality (VR) applications or augmented reality (AR) applications.

In at least one embodiment, platform controller hub 2030 enables peripherals to connect to memory device 2020 and processor 2002 via a high-speed I/O bus. In at least one embodiment, I/O peripherals include, but are not limited to, an audio controller 2046, a network controller 2034, a firmware interface 2028, a wireless transceiver 2026, touch sensors 2025, a data storage device 2024 (e.g., hard disk drive, flash memory, etc.). In at least one embodiment, data storage device 2024 can connect via a storage interface (e.g., SATA) or via a peripheral bus, such as a Peripheral Component Interconnect bus (e.g., PCI, PCI Express). In at least one embodiment, touch sensors 2025 can include touch screen sensors, pressure sensors, or fingerprint sensors. In at least one embodiment, wireless transceiver 2026 can be a Wi-Fi transceiver, a Bluetooth transceiver, or a mobile network transceiver such as a 3G, 4G, or Long Term Evolution (LTE) transceiver. In at least one embodiment, firmware interface 2028 enables communication with system firmware, and can be, for example, a unified extensible firmware interface (UEFI). In at least one embodiment, network controller 2034 can enable a network connection to a wired network. In at least one embodiment, a high-performance network controller (not shown) couples with interface bus 2010. In at least one embodiment, audio controller 2046 is a multi-channel high definition audio controller. In at least one embodiment, system 2000 includes an optional legacy I/O controller 2040 for coupling legacy (e.g., Personal System 2 (PS/2)) devices to system. In at least one embodiment, platform controller hub 2030 can also connect to one or more Universal Serial Bus (USB) controllers 2042 connect input devices, such as keyboard and mouse 2043 combinations, a camera 2044, or other USB input devices.

In at least one embodiment, an instance of memory controller 2016 and platform controller hub 2030 may be integrated into a discreet external graphics processor, such as external graphics processor 2012. In at least one embodiment, platform controller hub 2030 and/or memory controller 2016 may be external to one or more processor(s) 2002. For example, in at least one embodiment, system 2000 can include an external memory controller 2016 and platform controller hub 2030, which may be configured as a memory controller hub and peripheral controller hub within a system chipset that is in communication with processor(s) 2002.

In embodiments, processor core(s) 2007 may include curve generation component 420, and graphics processor(s) 2008 may include color deficiency compensation component 220, each of which may be implemented in hardware, firmware, software, or a combination thereof.

Figure 21:
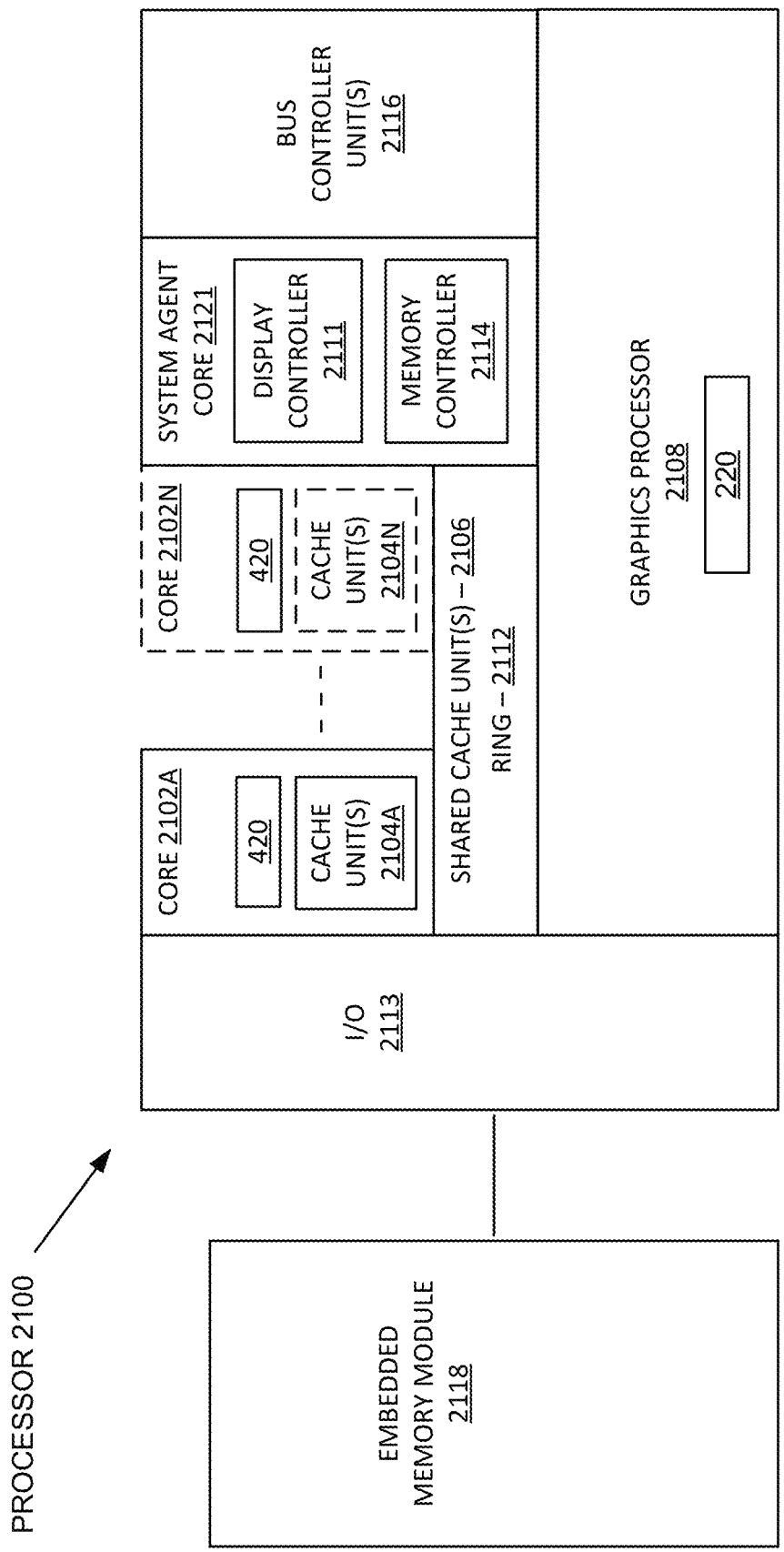
FIG. 21 illustrates at least portions of a graphics processor, according to one or more embodiments.

FIG. 21 is a block diagram of a processor 2100 having one or more processor cores 2102A-2102N, an integrated memory controller 2114, and an integrated graphics processor 2108, according to at least one embodiment. In at least one embodiment, processor 2100 can include additional cores up to and including additional core 2102N represented by dashed lined boxes. In at least one embodiment, each of processor cores 2102A-2102N includes one or more internal cache units 2104A-2104N. In at least one embodiment, each processor core also has access to one or more shared cached units 2106.

In at least one embodiment, internal cache units 2104A-2104N and shared cache units 2106 represent a cache memory hierarchy within processor 2100. In at least one embodiment, cache memory units 2104A-2104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2106 and 2104A-2104N.

In at least one embodiment, processor 2100 may also include a set of one or more bus controller units 2116 and a system agent core 2110. In at least one embodiment, one or more bus controller units 2116 manage a set of peripheral buses, such as one or more PCI or PCI express busses. In at least one embodiment, system agent core 2110 provides management functionality for various processor components. In at least one embodiment, system agent core 2110 includes one or more integrated memory controllers 2114 to manage access to various external memory devices (not shown).

In at least one embodiment, one or more of processor cores 2102A-2102N include support for simultaneous multi-threading. In at least one embodiment, system agent core 2110 includes components for coordinating and operating cores 2102A-2102N during multi-threaded processing. In at least one embodiment, system agent core 2110 may additionally include a power control unit (PCU), which includes logic and components to regulate one or more power states of processor cores 2102A-2102N and graphics processor 2108.

In at least one embodiment, processor 2100 additionally includes graphics processor 2108 to execute graphics processing operations. In at least one embodiment, graphics processor 2108 couples with shared cache units 2106, and system agent core 2110, including one or more integrated memory controllers 2114. In at least one embodiment, system agent core 2110 also includes a display controller 2111 to drive graphics processor output to one or more coupled displays. In at least one embodiment, display controller 2111 may also be a separate module coupled with graphics processor 2108 via at least one interconnect, or may be integrated within graphics processor 2108.

In at least one embodiment, a ring based interconnect unit 2112 is used to couple internal components of processor 2100. In at least one embodiment, an alternative interconnect unit may be used, such as a point-to-point interconnect, a switched interconnect, or other techniques. In at least one embodiment, graphics processor 2108 couples with ring interconnect 2112 via an I/O link 2113.

In at least one embodiment, I/O link 2113 represents at least one of multiple varieties of I/O interconnects, including an on package I/O interconnect which facilitates communication between various processor components and a high-performance embedded memory module 2118, such as an eDRAM module. In at least one embodiment, each of processor cores 2102A-2102N and graphics processor 2108 use embedded memory modules 2118 as a shared Last Level Cache.

In at least one embodiment, processor cores 2102A-2102N are homogenous cores executing a common instruction set architecture. In at least one embodiment, processor cores 2102A-2102N are heterogeneous in terms of instruction set architecture (ISA), where one or more of processor cores 2102A-2102N execute a common instruction set, while one or more other cores of processor cores 2102A-2102N executes a subset of a common instruction set or a different instruction set. In at least one embodiment, processor cores 2102A-2102N are heterogeneous in terms of microarchitecture, where one or more cores having a relatively higher power consumption couple with one or more power cores having a lower power consumption. In at least one embodiment, processor 2100 can be implemented on one or more chips or as a SoC integrated circuit.

In embodiments, graphics processor 2108 may include color deficiency compensation component 220, which may be implemented in hardware, firmware, software, or a combination thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU, GPU, DPU, or hardware accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A processor comprising:
   one or more circuits to:
   modify a spectral version of an image that is a frame of a video during a streaming of the video where at least one pixel has a spectral representation by, for at least one pixel of the spectral version of the image, modifying intensities of one or more wavelengths by applying the one or more wavelengths to a transformation curve that transforms the intensities from source wavelengths to destination wavelengths; and
   convert, during the streaming of the video, the modified spectral version of the image to a modified version of the image in a color space.

2. The processor of claim 1, wherein the color space is a red, green, blue (RGB) color space.

3. The processor of claim 1, wherein the transformation curve is a monotonically increasing curve.

4. The processor of claim 1, wherein the processor comprises a graphical processing unit (GPU), and wherein the one or more circuits are further to:
   receive the transformation curve from a central processing unit (CPU), the transformation curve having been generated by the CPU.

5. The processor of claim 4, wherein the transformation curve having been generated on the CPU based on a color deficiency profile (CDP) curve.

6. The processor of claim 1, wherein the one or more circuits are further to: receive the image, wherein the received image is in the color space; and
   convert the image from the color space into the spectral version of the image prior to modifying the image.

7. The processor of claim 1, wherein the one or more circuits are further to:
   determine a color deficiency profile (CDP) curve describing a vision deficiency of a person; and
   convert the CDP curve into the transformation curve based on integrating the CDP curve.

8. The processor of claim 7, wherein determining the CDP curve comprises: perturbing an initial CDP curve for one or more wavelengths; and
   replacing the initial CDP curve with the perturbed CDP curve responsive to determining that the perturbed CDP curve has a higher quality value than the initial CDP curve.

9. The processor of claim 7, wherein determining the CDP curve comprises:
   generating a plurality of modified versions of the image, wherein at least one modified version of the image is generated by applying the image to a different one of a plurality of transformation curves, at least one of the plurality of transformation curves being associated with a different CDP curve from another transformation curve of the plurality of transformation curves;
   presenting at least one of the plurality of modified versions of the image;
   receiving a selection of a modified version of the plurality of modified versions of the image; and
   selecting the transformation curve associated with the selected modified version of the image.

10. The processor of claim 1, wherein the one or more circuits are further to determine the transformation curve by:
    perturbing an initial transformation curve for one or more wavelengths; and
    replacing the initial transformation curve with the perturbed transformation curve responsive to determining that the perturbed transformation curve has a higher quality value than the initial transformation curve.

11. The processor of claim 1, wherein the one or more circuits are further to determine the transformation curve by:
    generating a plurality of modified versions of the image, wherein at least one modified version of the image is generated by applying the image to a different one of a plurality of transformation curves;
    presenting at least one of the plurality of modified versions of the image;
    receiving a selection of a modified version of the plurality of modified versions of the image; and
    selecting the transformation curve associated with the selected modified version of the image.

12. The processor of claim 1, wherein the spectral representation for at least one pixel is divided into a plurality of bins, wherein at least one bin of the plurality of bins is associated with a wavelength range.

13. The processor of claim 12, wherein the one or more circuits are further to:
for at least one destination wavelength, apply a spreading function to distribute an intensity for the at least one destination wavelength across at least two bins having a smallest distance from the at least one destination wavelength.

14. The processor of claim 13, wherein the spreading function comprises a triangular function.

15. The processor of claim 1, wherein the one or more circuits are further to:
generate a matrix representing the transformation curve, wherein, for at least one pixel, applying the one or more wavelengths of the spectral representation for the pixel to the transformation curve comprises performing a matrix operation using the matrix and the one or more wavelengths of the spectral representation for the pixel.

16. The processor of claim 1, wherein the one or more circuits are further to: perform greyscale preserving of the modified version of the image.

17. The processor of claim 16, wherein performing the greyscale preserving comprises, for at least one pixel of the image, performing the following comprising:
determining a gray value representing an amount of gray in the at least one pixel from the image; and
mixing an original color of the at least one pixel from the image with an adjusted color of the at least one pixel from the modified version of the image based on the gray value.

18. The processor of claim 17, wherein the mixing is performed according to the following equation:
$c_f = wc_0 + (1-w)c_d$, where $C_f$ is a final color of the pixel, $C_O$ is the original color of the pixel, $C_d$ is the adjusted color of the pixel, and w is the gray value.

19. The processor of claim 16, wherein the one or more circuits are further to: perform luminance balancing of the modified version of the image.

20. The processor of claim 19, wherein performing the luminance balancing comprises, for at least one pixel, performing the following:
computing a first luminance value of the at least one pixel for the image as viewed by a person without a color vision deficiency (CVD) and a second luminance value of the at least one pixel for the modified version of the image as viewed by the person with the CVD;
determining a scaling factor based on a ratio between the first luminance value and the second luminance value; and
applying the scaling factor to adjust an intensity of the at least one pixel.

21. The processor of claim 1, wherein the processor is comprised in a system, the system comprising at least one of:
a control system for an autonomous or semi-autonomous machine;
a perception system for an autonomous or semi-autonomous machine; a system for performing simulation operations;
a system for performing digital twin operations;
a system for performing deep learning operations; a system for performing remote operations;
a system for performing real-time streaming;
a system for presenting one or more of augmented reality content, virtual reality content, or mixed reality content;
a system implemented using an edge device; a system implemented using a robot;
a gaming system;
a teleconferencing system;
a system incorporating one or more virtual machines (VMs);
a system implemented at least partially in a data center;
a system for performing light transport simulation;
a system for performing collaborative content creation for 3D assets;
a system for generating synthetic data; or
a system implemented at least partially using cloud computing resources.

22. The processor of claim 1, wherein modifying intensities of one or more wavelengths by applying the one or more wavelengths to a transformation curve that transforms the intensities from source wavelengths to destination wavelengths comprises:
determining an intensity of a source wavelength for a pixel, wherein the intensity of the source wavelength is associated with a y-axis value for the transformation curve; and
determining an x-axis value of the transformation curve that corresponds to the y-axis value, wherein the x-axis value corresponds to a destination wavelength.

23. A system comprising:
a first processor to determine a transformation curve that transforms intensities from source wavelengths into destination wavelengths; and
a second processor to:
modify a spectral version of an image that is a frame of a video during a streaming of the video where at least one pixel has a spectral representation by, for at least one pixel of the spectral version of the image, modifying intensities of one or more wavelengths by applying the one or more wavelengths to the transformation curve; and
convert, during the streaming of the video, the modified spectral version of the image to a modified version of the image in a color space.

24. The system of claim 23, wherein the first processor comprises a central processing unit (CPU) and the second processor comprises a graphical processing unit (GPU).

25. The system of claim 23, wherein the second processor is further to: receive the image, wherein the received image is in the color space; and
convert the image from the color space into the spectral version of the image prior to modifying the spectral version of the image.

26. The system of claim 23, wherein the first processor is further to:
determine a color deficiency profile (CDP) curve describing a color vision deficiency of a person, wherein determining the transformation curve comprises integrating the CDP curve.

27. The system of claim 26, wherein determining the CDP curve comprises: perturbing an initial CDP curve for one or more wavelengths; and
replacing the initial CDP curve with the perturbed CDP curve responsive to determining that the perturbed CDP curve has a higher quality value than the initial CDP curve.

28. The system of claim 26, wherein determining the CDP curve comprises:
    generating a plurality of modified versions of the image, wherein at least one modified version of the image is generated by applying the image to a different one of a plurality of transformation curves, each of the plurality of transformation curves being associated with a different CDP curve;
    presenting at least one of the plurality of modified versions of the image;
    receiving a selection of a modified version of the plurality of modified versions of the image; and
    selecting the transformation curve associated with the selected modified version of the image.

29. The system of claim 23, wherein determining the transformation curve comprises: generating a plurality of modified versions of the image, wherein at least one modified
    version of the image is generated by applying the image to a different one of a plurality of transformation curves;
    presenting at least one of the plurality of modified versions of the image;
    receiving a selection of a modified version of the plurality of modified versions of the image; and
    selecting the transformation curve associated with the selected modified version of the image.

30. The system of claim 23, wherein determining the transformation curve comprises:
    perturbing an initial transformation curve for one or more wavelengths; and
    replacing the initial transformation curve with the perturbed transformation curve responsive to determining that the perturbed transformation curve has a higher quality value than the initial transformation curve.

31. The system of claim 23, wherein the second processor is further to:
    perform greyscale preserving of the modified version of the image by, for at least one pixel of the image, performing the following comprising:
    determining a gray value representing an amount of gray in the at least one pixel from the image; and
    mixing an original color of the at least one pixel from the image with an adjusted color of the at least one pixel from the modified version of the image based on the gray value.

32. The system of claim 23, wherein the second processor is further to perform luminance balancing of the modified version of the image by, for at least one pixel of the image, performing the following:
    computing a first luminance value of the at least one pixel for the image as viewed by a person without a color vision deficiency (CVD) and a second luminance value of the at least one pixel for the modified version of the image as viewed by the person with the CVD;
    determining a scaling factor based on a ratio between the first luminance value and the second luminance value; and
    applying the scaling factor to adjust an intensity of the at least one pixel.

33. The system of claim 23, wherein the system comprises at least one of: a control system for an autonomous or semi-autonomous machine;
    a perception system for an autonomous or semi-autonomous machine; a system for performing simulation operations;
    a system for performing digital twin operations;
    a system for performing deep learning operations; a system for performing remote operations;
    a system for performing real-time streaming;
    a system for presenting one or more of augmented reality content, virtual reality content, or mixed reality content;
    a system implemented using an edge device; a system implemented using a robot;
    a gaming system;
    a teleconferencing system;
    a system incorporating one or more virtual machines (VMs); a system implemented at least partially in a data center;
    a system for performing light transport simulation;
    a system for performing collaborative content creation for 3D assets; a system for generating synthetic data; or
    a system implemented at least partially using cloud computing resources.

34. A method comprising:
    receiving an image that is a frame of a video during a streaming of the video, wherein the received image is in a first color space;
    converting the image from the first color space into a spectral version of the image;
    modifying the spectral version of the image by, for at least one pixel of the image, modifying intensities of one or more wavelengths by applying the one or more wavelengths to a transformation curve that transforms the intensities from source wavelengths to destination wavelengths; and
    converting, during the streaming of the video, the modified spectral version of the image to a modified version of the image in the first color space.

35. The method of claim 34, further comprising:
    performing greyscale preservation of the modified version of the image by, for at least one pixel, performing the following:
    determining a gray value representing an amount of gray in the at least one pixel from the image; and
    mixing an original color of the at least one pixel from the image with an adjusted color of the at least one pixel from the modified version of the image based on the gray value.

36. The method of claim 34, further comprising:
    performing luminance balancing of the modified version of the image by, for at least one pixel, performing the following:
    computing a first luminance value of the at least one pixel for the image as viewed by a person without a color vision deficiency (CVD) and a second luminance value of the at least one pixel for the modified version of the image as viewed by the person with the CVD;
    determining a scaling factor based on a ratio between the first luminance value and the second luminance value; and
    applying the scaling factor to adjust an intensity of the at least one pixel.

37. The method of claim 34, wherein the method is performed using a system comprising at least one of:
    a control system for an autonomous or semi-autonomous machine;
    a perception system for an autonomous or semi-autonomous machine; a system for performing simulation operations;
    a system for performing digital twin operations;
    a system for performing deep learning operations; a system for performing remote operations;

a system for performing real-time streaming;
a system for presenting one or more of augmented reality content, virtual reality content, or mixed reality content;
a system implemented using an edge device; a system implemented using a robot;
a gaming system;
a teleconferencing system;
a system incorporating one or more virtual machines (VMs); a system implemented at least partially in a data center;
a system for performing light transport simulation;
a system for performing collaborative content creation for 3D assets; a system for generating synthetic data; or
a system implemented at least partially using cloud computing resources.

* * * * *